(12) United States Patent
Caldwell

(10) Patent No.: US 8,365,719 B2
(45) Date of Patent: Feb. 5, 2013

(54) MULTI-RECEIVER HELIOSTAT SYSTEM ARCHITECTURE

(75) Inventor: Douglas W. Caldwell, Glendale, CA (US)

(73) Assignee: Angeles Technologies, Inc., Glendale, CA (US)

( * ) Notice: Subject to any disclaimer, the term of this patent is extended or adjusted under 35 U.S.C. 154(b) by 716 days.

(21) Appl. No.: 11/891,000

(22) Filed: Aug. 7, 2007

(65) Prior Publication Data
US 2009/0038608 A1 Feb. 12, 2009

(51) Int. Cl.
F24J 2/46 (2006.01)
(52) U.S. Cl. ............ 126/600; 126/684; 359/850; 353/3
(58) Field of Classification Search ............... 126/600, 126/684; 359/850; 353/3
See application file for complete search history.

(56) References Cited

U.S. PATENT DOCUMENTS

| | | | |
|---|---|---|---|
| 4,102,326 | A | 7/1978 | Sommer |
| 4,137,897 | A | 2/1979 | Moore |
| 4,227,513 | A | 10/1980 | Blake et al. |
| 4,276,872 | A | 7/1981 | Blake et al. |
| RE30,960 | E | 6/1982 | Sommer |
| 4,365,618 | A | 12/1982 | Jones |
| 5,578,140 | A | 11/1996 | Yogev et al. |
| 5,899,199 | A | 5/1999 | Mills |
| 6,131,565 | A | 10/2000 | Mills |
| 2004/0074490 | A1 | 4/2004 | Mills et al. |
| 2006/0060188 | A1 | 3/2006 | Hickerson |
| 2008/0087274 | A1 | 4/2008 | Chen |
| 2009/0038608 | A1 * | 2/2009 | Caldwell ............ 126/600 |

OTHER PUBLICATIONS

International Search Report dated Feb. 26, 2009, pp. 1-3.
"Solar Research Facilities Unit", http://www.weizmann.ac.il/ESER/solar_page.html, Solar Research Facilities Unit, Jul. 2002.
"The IEA SolarPACES Implementing Agreement", http://www.solarpaces.org/, SolarPACES, Jul. 4, 2007.
"Platforma Solar de Almeria", http://www.psa.es/webeng/index.html, Ministerio De Educacion Y Ciencia.
"Solar Thermal Electric: The Technology", http://www.sabregen.co.za/solar/solar-tech.html, SABRE-Gen Solar Energy, Oct. 10, 2006.
"CSP—How it Works", http://www.solarpaces.org/CSP_Technology/csp_technology.htm, SolarPACES, Jan. 9, 2007.
"Distributed Power Towers—The Lowest Cost from Photon to Electron", http://www.brightsourceenergy.com/dpt.htm, BrightSource Energy, Jun. 17, 2007.
"Custom Solutions for Utility-Scale Solar Power", http://www.esolar.com/, eSolar, Jun. 29, 2007.

(Continued)

*Primary Examiner* — Alfred Basichas
(74) *Attorney, Agent, or Firm* — Ronald E. Perez

(57) ABSTRACT

A system architecture for large concentrated solar power applications that increases heliostat utilization efficiency and land utilization efficiency is described. Embodiments of the invention include a large heliostat field in which are distributed a number of receiving locations, and wherein there is the assignment of heliostats to receiving locations is dynamic. Embodiments of the invention include dynamically targeting heliostats to receiving locations wherein the target determination process is performed frequently during operation and wherein such dynamic targeting can be utilized to various ends. Embodiments of the invention include configurations wherein cosine losses associated with heliostat pointing are significantly reduced, wherein heliostats may be closely packed without incurring substantial shadowing and blocking losses thereby significantly increasing land utilization, and wherein other benefits are realized.

12 Claims, 26 Drawing Sheets

OTHER PUBLICATIONS

"Shining On—Chapter 4—Fig. 3", http://rredc.nrel.gov/solar/pubs/shining/page12_fig.html, National Renewable Energy Laboratory, Jul. 11, 2007.

Internet website article by Manos, Steven. "Multi tower solar array (MTSA) technology," Applied and Plasma Physics School of University of Sydney, http://www.physics.usyd.edu.an/app/researc/solar/mtsa.html. Last updated Monday, Apr. 15, 2002.

* cited by examiner

MULTI-RECEIVER HELIOSTAT SYSTEM ARCHITECTURE

BACKGROUND OF THE INVENTION

The present invention is directed to solar energy collection devices, and more particularly to a system and method for controlling a field of heliostats used to direct solar energy to a plurality of receivers for power generation.

Various technologies have been explored, developed, and implemented for generating electricity from solar energy. The two principal technologies for converting solar energy into electricity are photovoltaic and thermal means. Photovoltaic "solar cells" convert incoming photons directly into electricity using the photoelectric effect, for example using semiconductors based on silicon (Si) or gallium-arsenide (GaAs). Thermal conversion captures broadband solar radiation in a heat transfer medium (for example, oil, water, or air) and then uses a traditional steam or gas turbine to spin a generator. The simplest systems mount solar energy collectors in a manner that fixes their orientation with respect to the surface of the Earth; however, many technologies used for converting solar energy into electricity actively track the motion of the Sun. Tracking refers to following the motion of the Sun as it moves across the sky through the day and how this path changes through the seasons. In particular, systems that concentrate solar radiation to high intensity require some form of active tracking. Very low concentrations (less than two times to about five times the level of incident radiation) can be achieved without using tracking systems. Such systems typically cannot generate power throughout the day. Low concentration is also incompatible with thermal power generation means.

As used herein, Concentrated Solar Power (CSP) technologies are technologies that use Sun-tracking optical elements to concentrate solar radiation. Although, as noted above, some technologies implement and utilize low concentration factors, systems utilizing such technologies are not the subject of this invention and are thus excluded herein from the definition of CSP for conciseness. Concentrating solar power systems collect solar radiation at its standard irradiance level of about one thousand watts per square meter (W/m$^2$) and concentrate it to a higher intensity at its point of use. In such systems, the element or subsystem that collects solar energy is called the collector and the element or subsystem that concentrates solar energy is called the concentrator. In many systems, the collection and concentration functions are performed by a single subsystem. In such systems, the integrated element or subsystem may be referred to as either a collector or a concentrator, interchangeably. This element or subsystem may also be referred to as the primary optical element or primary optical subsystem of the system. The collecting and concentrating elements might be reflective (mirrors) or refractive (lenses), and a system might use a combination of the two.

In concentrating solar systems, the final destination of the solar radiation is generally referred to as a receiver. The receiver might perform direct conversion to electricity (for example, using photovoltaic means), might capture the energy as heat, or might use the energy for other purposes (for example, lighting). In many systems, a secondary optical element or secondary optical subsystem is collocated with the receiver and might be considered to be part of a receiver assembly. This secondary optic might perform concentration, beam homogenization, or other functions. The higher intensity created by concentration can be desired to generate higher temperature at the receiver, produce higher photovoltaic cell efficiency, or require smaller receivers.

There are three main CSP technologies being developed internationally: parabolic-trough power plants, parabolic dish systems, and central receiver systems. CSP technologies have been constructed in various sizes, including small multi-kilowatt (kW) systems and large power stations of tens of megawatts (MW). Such power stations have provided the cheapest electricity to be generated using solar energy.

Parabolic-trough power plants utilize large fields of Sun-tracking, linear parabolic trough collectors that concentrate energy onto steel tubes through which circulates a heat transfer fluid (HTF). This high temperature fluid is pumped through heat exchangers to generate steam of up to 400° C. that are used to power a conventional steam turbine to produce electricity. These systems achieve moderate levels of concentration, typically about ten times to about one-hundred times the level of incident radiation. This type of concentration, sometimes referred to as 2-D (two-dimensional) concentration, is thermodynamically limited to just over two-hundred times the level of incident radiation. Typically arranged on north-south lines, the collectors rotate around a north-south axis to track the Sun from east to west during the day to ensure that the Sun is continuously focused on the linear receiver tubes.

A variant on the parabolic trough concept uses a Fresnel arrangement of long, linear reflective elements to synthesize the optical function of the parabolic trough reflector. The linear reflective elements are rotated along their long axes to effect the pointing control function that is equivalent to rotating the parabolic trough about its long axis. These systems are referred to as linear Fresnel reflectors.

For various reasons, higher levels of incident radiation concentration then can be achieved by 2-D concentration (for example, as used in parabolic-trough power plants) might be necessary to be economically attractive. These reasons might include higher efficiency from higher temperature fluid feeding a steam plant or lower receiver area for high-cost multi-junction solar cells that can handle the higher intensity illumination.

Concentration ratios of as high as three-thousand times the level of incident radiation have been described in the literature. Concentration levels above about two-hundred times the level of incident radiation generally require using three-dimensional (3-D) concentration. A parabolic dish reflector provides one example of a 3-D concentrator. To provide the high levels of concentration that the parabolic dish can provide, the dish must be continuously reoriented to track the motion of the Sun across the sky. This approach has been applied to dishes of up to about ten meters in diameter. At very large sizes, a single large reflector becomes increasingly difficult to build or to control with the requisite precision.

As shown in FIG. 1, the central receiver architecture 100, also known as "power tower architecture," includes a system of hundreds or thousands of large, two-axis reflector systems that track the Sun 190 and reflect incident radiation to a common receiving location 110. Each tracking reflector system is referred to herein as a "heliostat" 150, which is a device in which one or more mirrors are moved to direct solar radiation in a specified direction for a period of time. The set of all heliostats in a solar energy collection system is referred to as a "heliostat field," which might be organized as one or more heliostat subfields 162, 164, 166, 168. A "receiver" (a device for capturing solar radiation and converting it into another form of energy) is generally placed at the receiving location 110. The receiving location 110 is placed well above the heliostat field, typically on a tower so as to elevate the receiving location above the ground level of the heliostat field and to help prevent interference between the reflected radiation and other heliostats. Using heliostats, a large number of reflectors can be made to track the Sun's motion during the course of a single day and accommodate the Sun's changing path from day to day through the seasons. This approach can provide very high levels of concentration of incident radiation.

The central receiver architecture uses a relatively large number of heliostats (from hundreds to thousands), typically arranged in concentric rows 172, 174, 176, 178 to direct incident radiation from the Sun 190 to a single "receiver" (a device for capturing solar radiation and converting it into another form of energy), resulting in a typical concentration ratio between 500:1 and 1000:1, though lower and higher ratios have been discussed and/or implemented. The heliostats are generally implemented as very large structures so as to control heliostat field costs by minimizing the number of units built and improving the ratio of reflector area relative to such items as control motors. The size of the structures results in scaling issues related to bending, wind-loading, and construction.

Referring to FIG. 2, the prior art contemplates an approach for implementing hundreds or thousands of megawatts of generating capacity wherein a large land area would be populated with a number of central receiver systems 210, 220, 230, 240. In such an approach, the design of a single power tower 211, 221, 231, 241, associated generating and support equipment 212, 222, 232, 242, and associated heliostat field 217, 227, 237, 247 is replicated multiple times. Further, the prior art contemplates designing each central receiver and associated heliostat field to provide several tens of megawatts of capacity apiece, as is considered necessary to reduce per-plant development costs (for example, environmental impact reports, development planning, common parts manufacturing, etc.) and operations and maintenance costs (by sharing personnel, equipment and spares between multiple systems). While the prior art includes significant approaches for optimizing a single central receiver power station, the replication of a single design across large land areas, as illustrated in FIG. 2, obscures the fact that this creates a new, larger meta-system whose overall performance can be further optimized. Heretofore known solar energy collection systems do not provide a method for optimization across the several heliostat fields.

Referring to FIG. 3, a prior art central receiver system uses a plurality of heliostats 350 to direct and concentrate incident radiation 392 to a single central receiver 310. The receiver 310 absorbs concentrated solar radiation 394, converts it to heat, and uses it to heat an HTF 326, such as a synthetic oil or molten salt, to a specified temperature. The degree of heating of and heat transfer to the receiver depends on several design factors, such as heliostat field size, receiver shape and size, HTF limitations, thermodynamic limitations, and end-use application. A power generation system 320 for converting the heat generated by the solar portion of the system may include a tank 328 for storing hot HTF, a steam generator 342 that uses the HTF to generate high quality steam, and a tank 324 for storing cooler HTF after heat has been extracted for steam generation before returning the HTF via pipes 322 to the receiver. The output of the steam generator 342 is fed to a conventional electric power generation system 340 that may include a steam turbine 346 and a condenser 348 that feeds water and/or used steam back to the steam generator. Electricity may be conducted to a power grid 360 by conventional transmission systems 362. The most common end-use application for central receiver technology is a Rankine power cycle, although the technology can also be used as the heat source for other, more efficient cycles such as Brayton/combined cycle as well as high-temperature process steam. Various investigations have also explored the use of photovoltaic receivers on a small scale, but no large system is known to have been implemented using this approach.

Referring to FIG. 4, the reflecting element of a single heliostat 400 can approximate a curved surface by using a number of smaller mirrors 412, 414, 416. Each individual heliostat is then controlled in such a way that its reflected radiation is directed to a receiver. A heliostat used at 35° latitude must generally have enough range of motion to accommodate the motion of the Sun from 65° E (summer solstice sunrise at 35° latitude) to 65° W (summer solstice sunset) or a total of 310° of azimuth angle, plus almost 80° of motion in elevation. Heliostats capable of the required range of motion are generally built using an azimuth motor and bearing plus an elevation motor and bearing. Such trackers are called "az-el" mounts.

As shown in FIG. 4, the reflecting element or surface of the heliostat is configured from one or more mirrors 412, 414, 416 that may be secured by a vertical fixing mechanism 420 and brackets 422 and/or horizontal brackets to combine the individual mirrors into a reflector assembly, creating essentially a single reflecting surface. The heliostat may include a standard, pole or other supporting structure 430 having a plate or other anchoring device 432 for securing the supporting structure to the earth or other surface, such as a rooftop. Specialized electronics, such as motor controllers, computers and interfaces with external sensors, may be included within a section 450 of the heliostat supporting structure. These electronics are operably connected to a dual-axis actuator 460 (for example, "az-el" mounts) that is mechanically connected to a horizontal bar 440 or other mechanism that is connected to the brackets 420 of the heliostat reflector assembly. By way of example and not as a limitation, other solar systems having one or more collectors for receiving and using radiant energy from the Sun are found in U.S. Pat. Nos. 4,276,872; 4,227,513; 4,137,897; 5,899,199; 6,131,565; 4,102,326; and RE 30,960, the contents of each of which are hereby incorporated herein by reference.

Three types of solar radiation 500 are illustrated in FIG. 5. Whereas flat-panel photovoltaic devices can utilize both diffuse radiation 580 and ground-reflected radiation 520, concentrating optics 550 generally only use incident solar radiation 510 that travels directly from the Sun 590 through the atmosphere to the optics. This radiation is termed "direct beam radiation" or "direct insolation." Other solar radiation is not available to such a collection system, such as reflected radiation 530, scattered radiation 570, or absorbed radiation 560 all caused by clouds, dust, and other phenomena of the atmosphere 560.

The utilization of solar radiation in central receiver systems requires attention to losses caused by two effects, termed cosine effects and shadowing and blockage effects (see FIGS. 14-22). Cosine loss is the effective loss of aperture area of a heliostat reflector due to tilting the reflector away from the Sun. A heliostat "shadows" another heliostat when a first heliostat intercepts the Sun's rays before it reaches a second heliostat. A heliostat "blocks" another heliostat when a first heliostat prevents the Sun's rays from being further used in the system. Shadowing and blockage decrease utilization of heliostats and thus have indirect costs. The typical spacing of heliostats in prior art central receiver systems to address shadowing and blocking leads to relatively low land-use efficiency. The typical spacing in such systems also leads to significant heliostat distances, which in turn also increases losses due to atmospheric path-length absorption and beam spread.

Cost-effective implementation of heliostat fields in the prior art has addressed cosine losses by biasing heliostat placement toward the north of a central receiver (in the northern hemisphere), sometimes at significant distances and with consequent atmospheric transmission losses, and by avoiding placing many heliostats to the south of the central receiver. However, cosine losses incurred in the early morning and later afternoon have been heretofore considered unavoidable. The prior art has addressed shadowing and blocking through the use of optimized heliostat field layouts that minimize these effects to increase the cost-effectiveness of the heliostat field. This approach results from the preference for acute-angle reflection to avoid cosine losses but results in relatively low land area utilization.

By way of definition, when the angle between the incident light ray and reflected light ray is less than perpendicular (90°), the phenomenon is referred to herein as an "acute-angle reflection" (see FIG. 15). Conversely, when the angle between the incident light ray and reflected light ray is greater than perpendicular (90°), the phenomenon may be termed an "oblique-angle reflection (see FIG. 16).

Accordingly there is a need for, and what was heretofore unavailable, a method and apparatus for further reducing cosine losses and shadowing and blocking effects in heliostat fields used for solar power concentration, and for increasing the land use efficiency of heliostat fields. The present invention solves these and other needs.

SUMMARY OF THE INVENTION

The present invention is directed to the architecture of concentrated solar power (CSP) systems utilizing heliostats and methods for controlling fields of heliostats in concentrated solar power systems to improve the utilization of individual heliostats and the utilization of land required by heliostat fields. The approach is similar to the central receiver architecture, but has features that reduce cost by increasing the efficiency of heliostats, by allowing denser packing of heliostats (sun-tracking reflector assemblies), and by supporting substantial flexibility in sizing and siting to reduce development risk. The present invention is expected to substantially reduce the development, deployment, and operations and maintenance costs of the heliostat field, and to reduce the land-use footprint required for such plants. Land use becomes limited by providing open areas required for construction and maintenance access.

The apparatus and method of the present invention allows each heliostat in a solar energy collection system configured from a plurality of heliostats and receivers to be dynamically targeted to a plurality of acceptable receiver locations over time. The architecture of the present invention is contrasted with prior art systems, wherein each heliostat is statically and permanently assigned to direct incident solar radiation to a single central receiver positioned at a fixed receiving location. The present invention discloses a method of dynamic retargeting of heliostats in a field and discloses how the retargeting method of the present invention can provide the ability to reduce cosine, shadowing, blockage and other losses and/or reduce the range of motion required by each heliostat.

The dynamic retargeting of heliostats to various receiver locations provides operational flexibility to:
(1) Perform maintenance on a receiver without losing all the power-collection capability of some large group of heliostats (for example, losing the utility of all heliostats associated with a single receiver if each heliostat were statically assigned to one specific receiver);
(2) React to faults that take a receiver offline, retargeting its associated heliostats to adjacent receivers so as to not lose power generating capability;
(3) Maintain higher (or relatively constant) incident receiver power through the day by (for instance) idling some receivers early and late in the day (or longer in winter) to allow higher concentration of weaker (more attenuated) solar radiation.

In an embodiment of the present invention, any static physical or geometrical relationship between collecting/focusing elements (heliostats) and receivers is removed. The most generic layout would be a large number of heliostats arranged in a uniform rectilinear grid pattern or a triangular grid pattern. This approach is not used in prior art systems because under the assumption of a single receiver being associated with a given heliostat field, it is more cost-effective to use a radial stagger pattern to optimize the heliostat field layout to avoid self-shadowing and blockage by the heliostats.

A system with a relatively dense layout of heliostats in a decoupled, uncommitted design provides various additional advantages. In such a system, without fundamentally changing the layout of the heliostat field:
(1) Receiver types can be changed as technology or economics change, or as a system evolves from a smaller-scale prototype plant to full-scale production operation;
(2) New receivers can be sited differently if their characteristics change (for example, height or allowable concentration ratio/heat flux);
(3) A mix of different receiver types in the same heliostat field for evolution, technology demonstration and/or investigation, different desired efficiencies, and/or different electricity values as a function of time of day or season. Revenue generation might be maximized by providing (for instance) a mix of both photovoltaic and thermal receivers and dynamically selecting a preferred receiver for each heliostat based on (for instance) the value of immediate power production at higher efficiency (as provided by a photovoltaic converter) or the value of time-shifted power generation (as provided by a thermal receiver and heat storage system).

The various flexibilities described above cannot be supported by existing parabolic trough, parabolic dish, or central receiver approaches. Further, only by considering a collection of "central" receivers as a system of systems can some optimizations be performed.

The solar energy collection system of the present invention includes a first receiver configured at a first receiving location for receiving solar energy and a second receiver configured at a second receiving location for receiving solar energy. The system further includes a plurality of heliostats each having a reflector assembly, wherein each heliostat is configured to orient the reflector assembly so as to direct incident solar radiation toward the first receiver, and wherein each heliostat is configured to orient the reflector assembly so as to direct incident solar radiation toward the second receiver, wherein the second receiving location is geographically separated from the first receiving location. Each heliostat may be controlled such that an angle between the incident solar radiation and reflected solar radiation directed to the first receiver is an acute angle or oblique angle or always is an acute or oblique angle.

A solar energy collection system of the present invention may be configured with a plurality of receivers each receiver being positioned at a geographically separate receiving location from each other receiver and being configured for receiving solar energy. The system may include a plurality of heliostats, each heliostat having a reflector assembly and being controlled to orient the reflector assembly so as to direct incident solar radiation toward each one of the receivers. One or more heliostats are configured within a first associated heliostat group to dynamically target incident solar radiation to a first receiver under a first set of operating conditions. In addition, one or more heliostats may be configured within a second associated heliostat group to dynamically target incident solar radiation to a second receiver under a first set of operating conditions One heliostat in the associated heliostat group may be configured to retarget incident solar radiation to the second receiver under a second set of operating conditions.

A method for directing a receiver of a heliostat of the present invention includes determining a system state, computing an objective function, computing values of an objective function, selecting heliostat targets using the objective function values and commanding heliostats to selected targets.

The aforementioned and other features and advantages of the invention will become further apparent from the following detailed description of the invention, read in conjunction with the accompanying drawings. The detailed description and drawings are merely illustrative of the invention rather than limiting, the scope of the invention being defined by the appended claims and equivalents thereof.

DETAILED DESCRIPTION OF THE INVENTION

Figure 1:
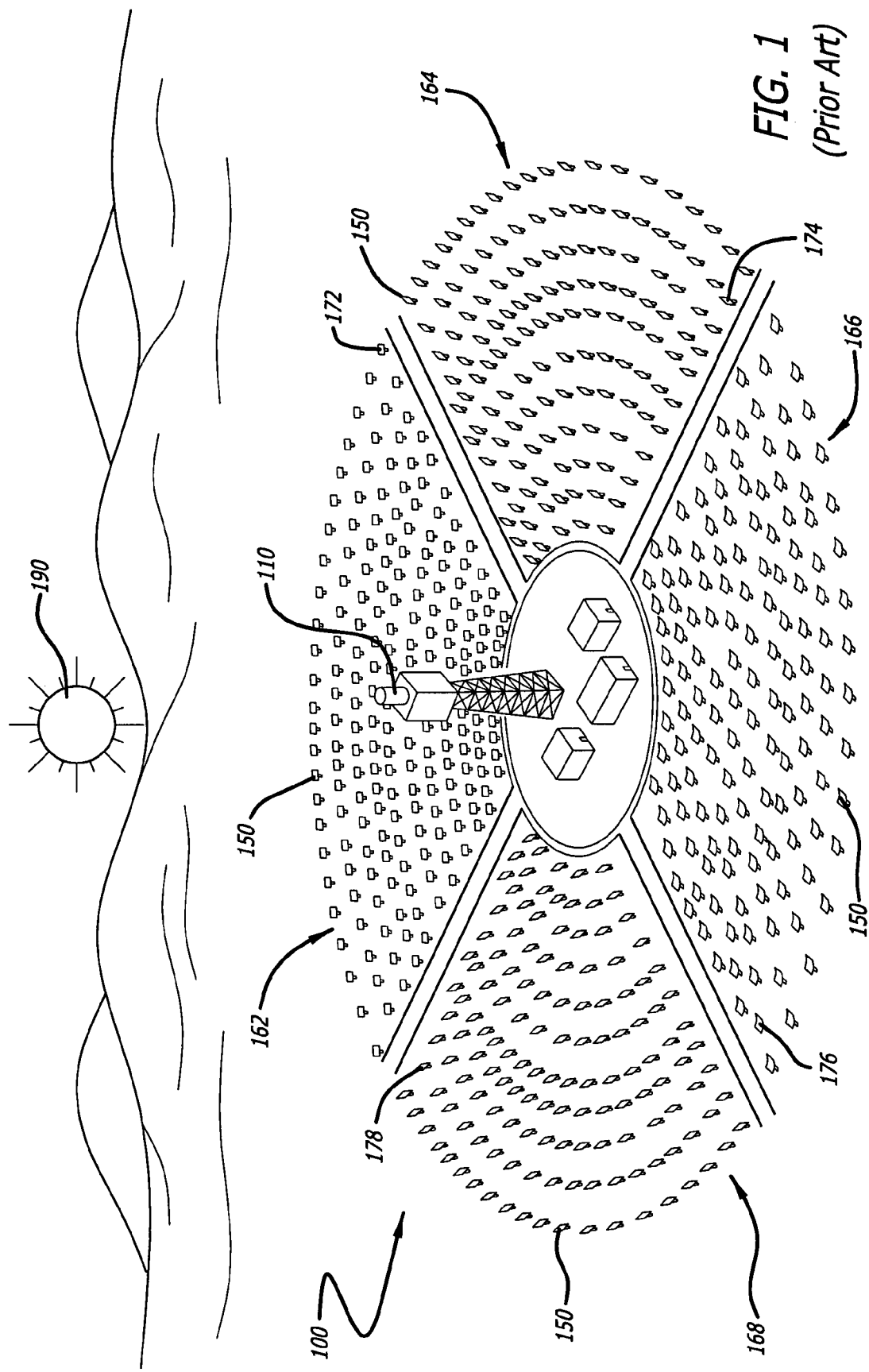
FIG. 1 is a schematic representation of a concentrated solar power system, having a plurality of subfields of heliostats and a central receiving tower power generation system.
Figure 2:
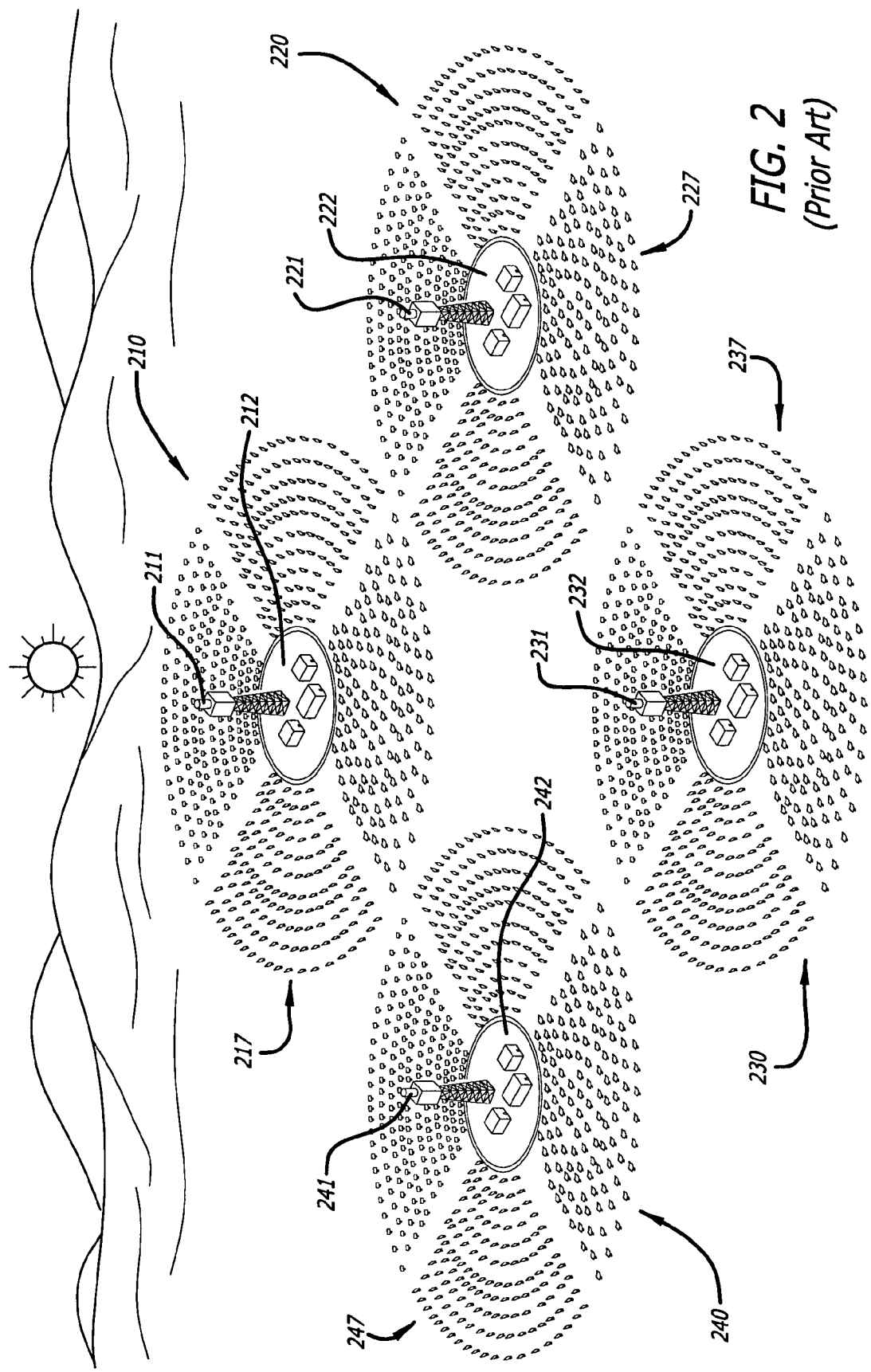
FIG. 2 is a schematic representation of a plurality of concentrated solar power systems as shown in FIG. 1.
Figure 3:
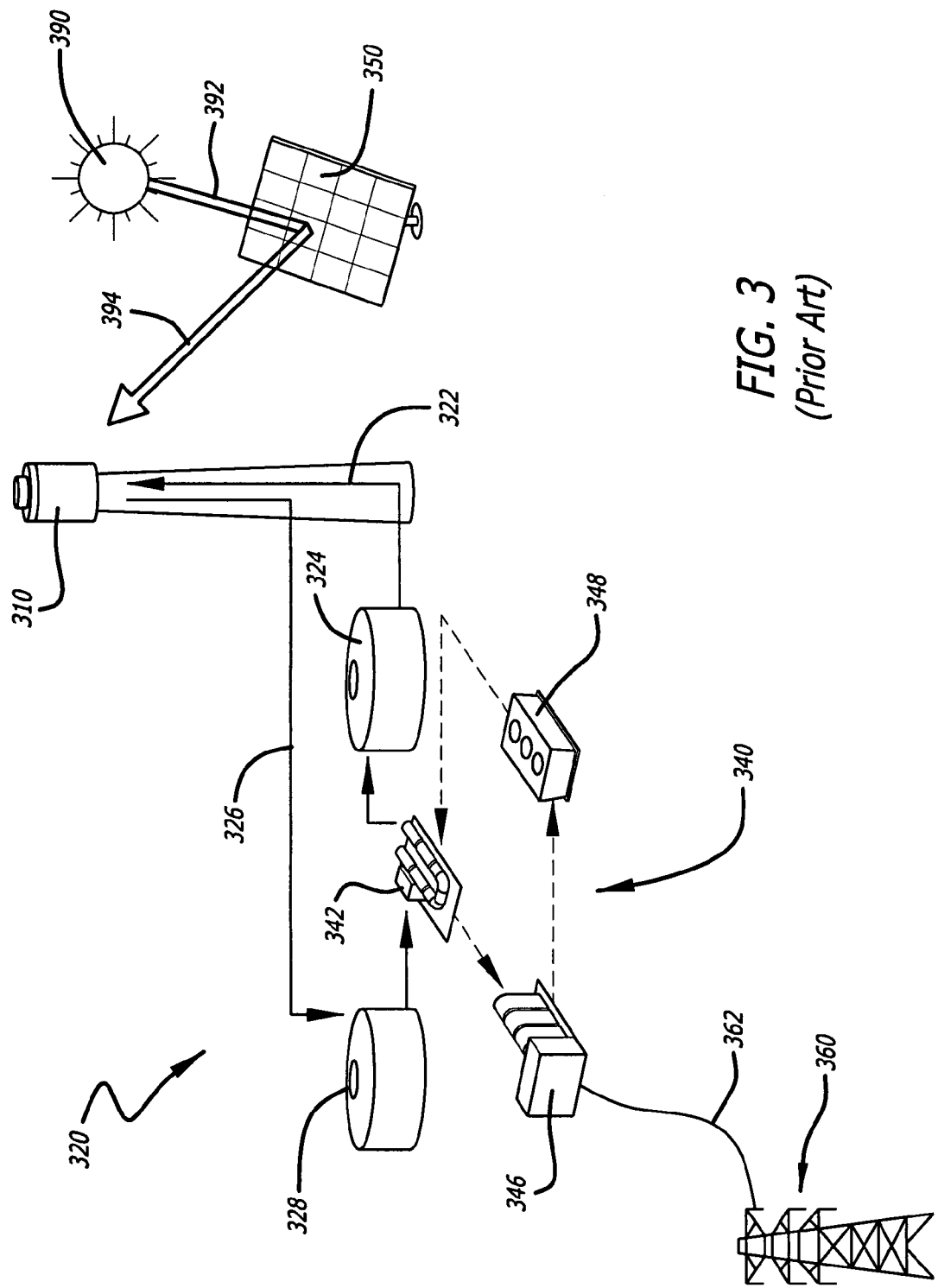
FIG. 3 is a schematic representation of a power generation system for a central receiver architecture having a molten salt central receiver power plant.

The subject invention improves the utilization of heliostats (sun-tracking reflector assemblies), simplifies the design of heliostats, and allows better land utilization by heliostat fields used for concentrated solar power generation (CSP) systems. The systems and methods of the present invention improve upon the conventional central receiver architecture, having features that reduce cost by increasing the efficiency of heliostats, by allowing denser packing of heliostats, and by supporting substantial flexibility in sizing and siting to reduce development risk.

By way of definition, the term "receiver" is used herein to refer to a device for capturing incident radiation and converting such incident radiation into another form of energy. The term "receiving location" is used herein to refer to the common location to which solar radiation is directed by a plurality of heliostats. A receiver may be placed at the receiving location; however, the receiving location may alternatively provide secondary redirection of solar radiation in accordance with an aspect of the present invention. In particular, a receiver assembly of the present invention may include, but is not limited to, secondary concentration optics in addition to the portion of the receiver assembly configured to convert incident radiation.

In a system having two receiving locations, there must be some amount of separation between the two receiving locations lest they be considered to be the same receiving location. The term "geographically separated" will be used herein to pertain to receiving locations that are sufficiently separated as to be considered distinct for the purposes of the present invention. Separation may be measured many ways as appropriate to the design of a system, including but not limited to: absolute units of radial distance (for example, meters); absolute units of distance relative to a reference (for example, meters above ground level); absolute units of angular separation (for example, degrees of angle between lines of sight to two receiving locations as viewed from a heliostat); absolute units of angle relative to a reference (for example, degrees of azimuth or elevation between lines of sight to two receiving locations as viewed from a heliostat); relative units of distance (for example, the ratio of radial distances between a heliostat and each of two receiving locations, or number of heliostat-separation-distances between two receiving locations); relative units of angular separation (for example, the ratio of the cosine of the azimuth angle of a first receiving location relative to a heliostat and the cosine of the azimuth angle of a second receiving location relative to the heliostat).

As will be appreciated in the description herein, the of utility of the present invention is apparent when considering geographically separated receiving locations. For example, a system providing each heliostat with a plurality of usable receiving locations that are generally separated by 30° in azimuth may be considered to have geographically separated receiving locations. Also, for example, a system having heliostats utilizing receiving locations that are generally separated by five times the average distance separating heliostats may be considered to have geographically separated receiving locations. The threshold for considering receiving locations to be geographically separated may depend on the operational characteristics of the system. For example, in a system utilizing primarily acute-angle reflections, providing each heliostat with a plurality of usable receiving locations that are generally separated by 20° in azimuth may be considered to have acceptably spaced geographically separated receiving locations because the cosine loss incurred by selecting a particular receiving location may be acceptably small, whereas in a system utilizing primarily oblique-angle reflections, providing each heliostat with a plurality of usable receiving locations that are generally separated by 10° in azimuth may be considered necessary to have acceptably spaced geographically separated receiving locations because the cosine loss incurred by selecting a particular receiving location is higher in such a system.

This concept of geographically separated may be contrasted with prior art that describes placement of multiple receiving locations on a single tower or that describes placement of multiple receiving locations adjacent to each other for purposes of redundancy. In these examples of prior art, the receiving locations are not sufficiently separated to benefit substantially from the present invention and thus would not be considered to be different receiving locations.

Figure 6:
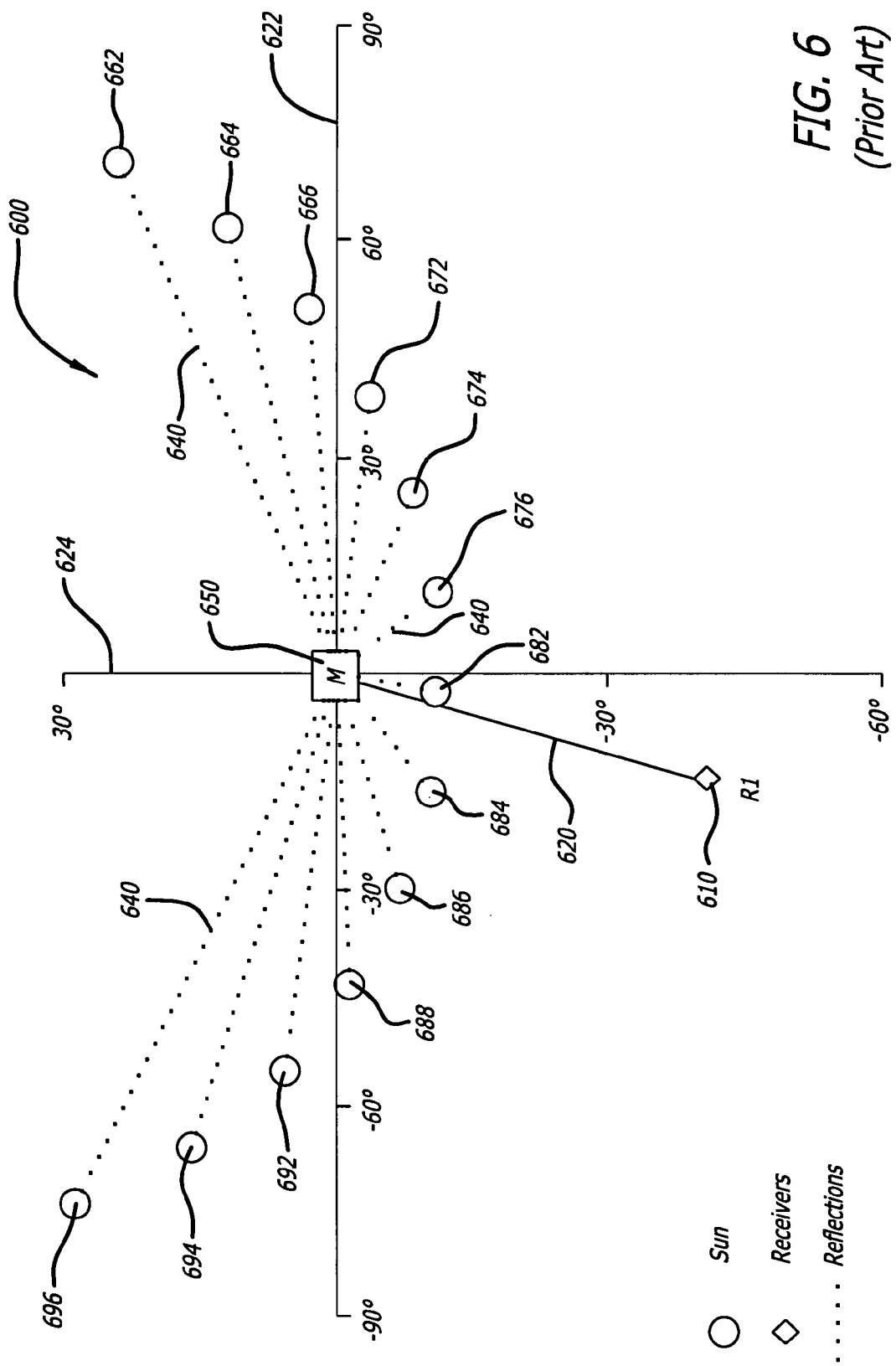
FIG. 6 depicts a schematic representation for heliostat tracking in a system with a single receiving location.

FIG. 6 illustrates the operation of a single heliostat (M) 650 in a prior art solar power system 600 that has a single central receiving location (R1) 610. The heliostat 650 tracks the motion of the Sun from the Sun's position shortly after sunrise 662 (for example, 6:00 a.m.) to the Sun's position shortly before sunset 696 (for example, 6:00 p.m.). The heliostat (M) 650 of the prior art is configured to reflect incident radiation to a single central receiving location 610 (R1). As the Sun moves across the sky, the heliostat 650 rotates or otherwise orients its reflector such that incident radiation is continuously reflected to the same receiving location 610. As shown in FIG. 6 for the specific example time of year and location of summer solstice at Barstow, Calif., U.S.A., the Sun moves from a position 662 at 65° east azimuth at 6:00 a.m. (shortly after summer solstice sunrise at 35° latitude) by hourly increments 664, 666, 672, 674, 676 to 12:00 noon 682, and continuing in the afternoon at hourly increments 684, 686, 688, 692, 694 until 6:00 p.m. (shortly before summer solstice sunset at 35° latitude) where its position 696 is 65° west azimuth. (The azimuth angle is the rotation angle around zenith as measured from North. When neither "east" nor "west" is indicated, azimuth angle is taken to be measured clockwise from North.) At sunrise and sunset, the Sun has a zenith angle (the angle between the Sun and zenith, see FIG. 19) of 90°, while at its highest point (as it crosses the meridian passing through the heliostat, which occurs shortly before 12:00 noon local standard time) the Sun position 682 has a zenith angle of 11.4°, equal to the latitude of Barstow, 34.9°, minus the latitude of the Tropic of Cancer, 23.5°. In FIG. 6, the two axes 622, 624 are marked in units of degrees, so as to provide a scale for the zenith angles at each position 662-696 of the Sun as indicated by the length of each line between the heliostat (M) 650 and the respective Sun position 662-696. For example, at noon local standard time, when the Sun position 682 has a zenith angle of 11.7°, the length of the line in FIG. 6 between the heliostat (M) 650 and the Sun position 682 has a length of 11.7° according to the scale indicated by the adjacent axis 624.

Figure 4:
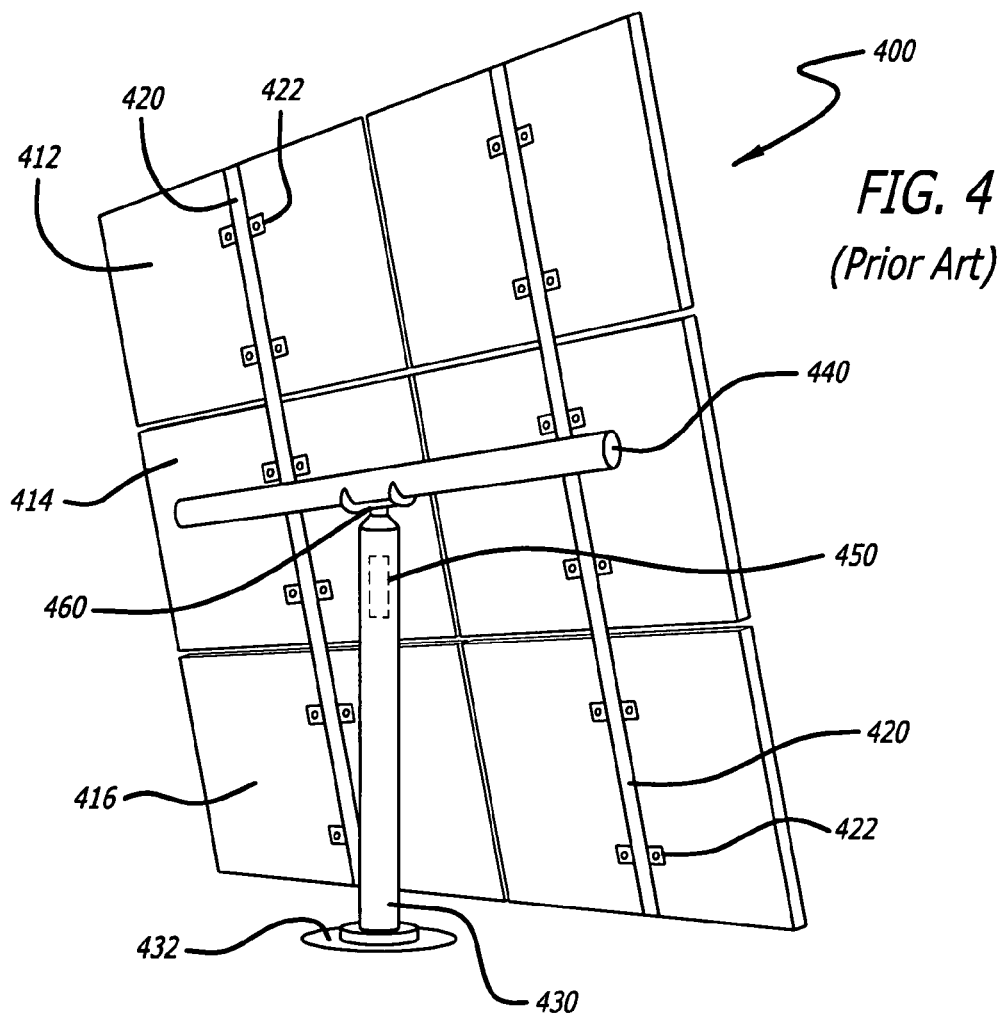
FIG. 4 depicts a schematic representation of a prior art heliostat having a plurality of mirrors and an orienting system.
Figure 5:
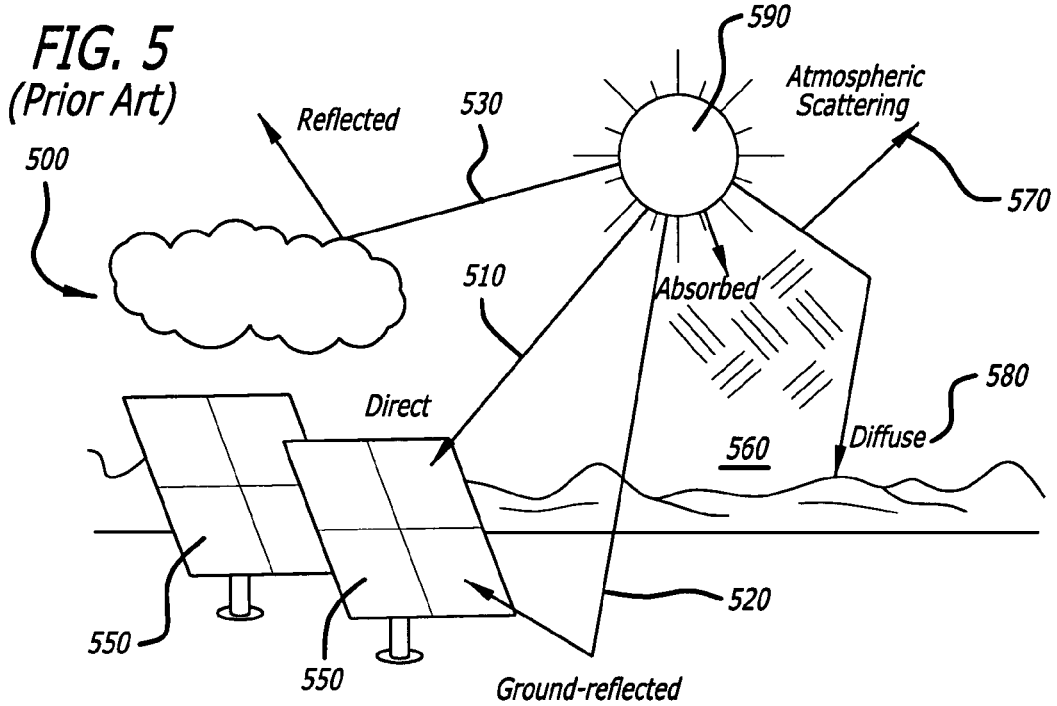
FIG. 5 is a schematic representation depicting types of solar radiation as they apply to concentrating solar power systems.

In such a central receiver system 600, the heliostat 650 must be configured with enough range of motion to track the Sun for a total of about 310° of azimuth angle plus almost 80° of motion in elevation. (Elevation refers to rotational motion around an axis parallel to the surface of the Earth. An elevation angle is measured between a vector and the surface of the Earth and is considered positive rotating upward from the surface of the Earth.) Since the reflector's normal motion is half that of the tracked object (the Sun), the motion of the heliostat requires about 135° of azimuthal motion plus 40° of elevation motion. The geometry required by a heliostat placed south of the receiving location (in the northern hemisphere) might require even more motion to accommodate reflector orientations wherein the reflector normal can be pointed either north or south of the zenith. Heliostats capable of this range of motion are generally built using an azimuth motor and bearing plus an elevation motor and bearing, and are referred to as "az-el mounts" (see FIG. 4).

It should be noted that in prior art systems heliostats are targeted to locations other than the single central receiver for purposes of safety and standby operation; however, these targeted locations are considered to be receiver locations as the solar radiation incident upon heliostat reflectors is intentionally discarded for these operations.

Figure 7:
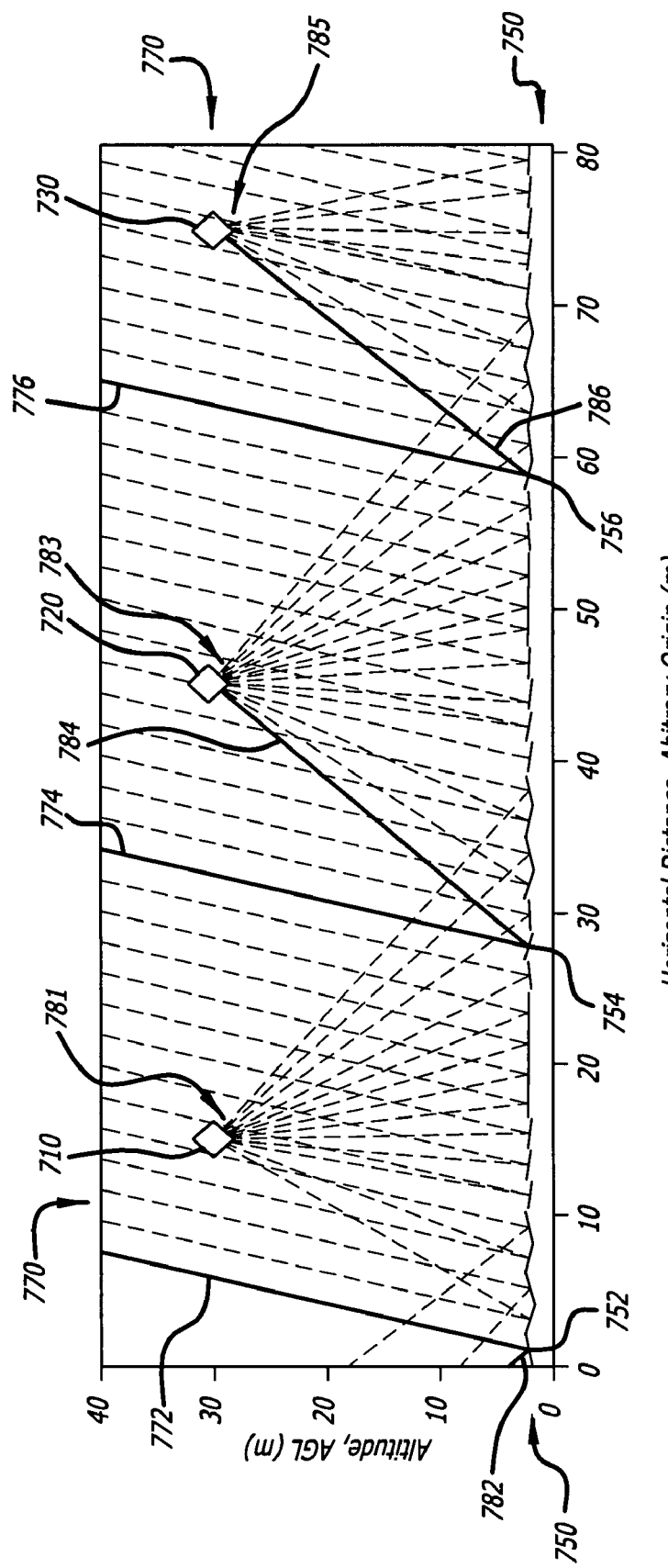
FIG. 7 depicts representative heliostat-receiver associations for an 80° Sun elevation angle in accordance with the present invention.
Figure 8:
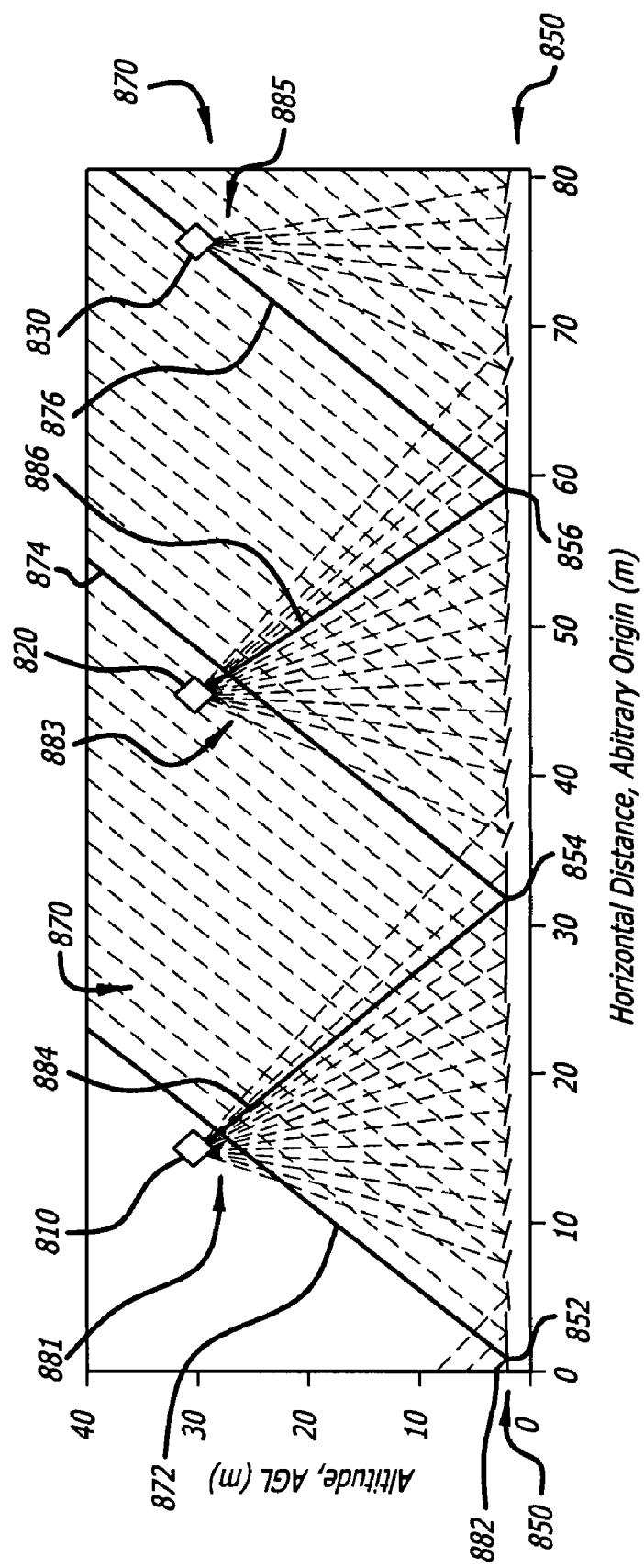
FIG. 8 depicts representative heliostat-receiver associations for a 60° Sun elevation angle in accordance with the present invention.
Figure 9:
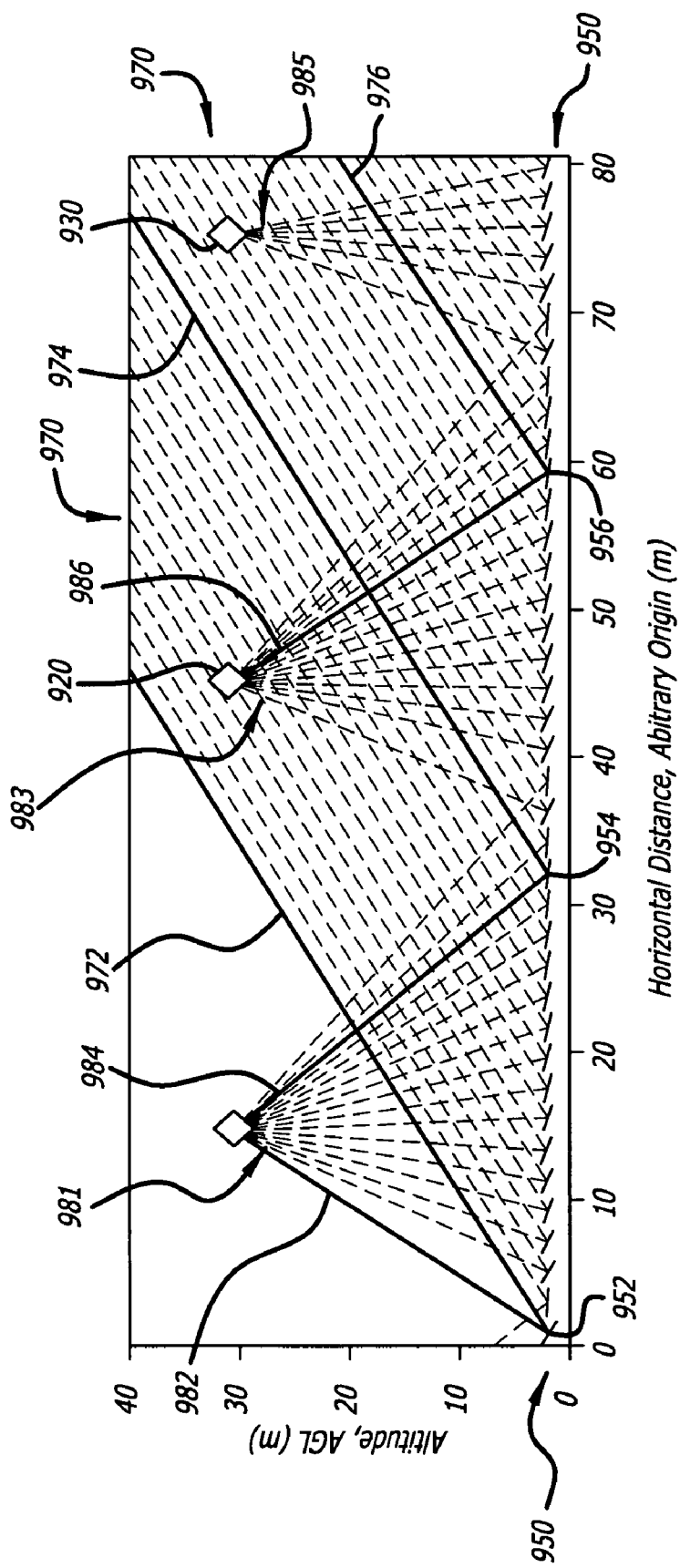
FIG. 9 depicts representative heliostat-receiver associations for a 40° Sun elevation angle in accordance with the present invention.

As shown in FIGS. 7, 8, and 9, a two dimensional representation of a plurality of heliostats and target receiving locations in accordance with the present invention is shown for three different Sun positions. Referring to FIG. 7, incident light rays 770 at an 80° elevation angle are incident upon a bank of heliostat reflectors 750. Starting at a horizontal distance of zero meters, a first group of heliostats between about ten and twenty-five meters horizontal provide a set of reflected rays 781 to a first receiving location 710. A second set of heliostats between about forty meters to fifty-five meters reflect rays 783 to a second receiving location 720. A third set of heliostats from about seventy meters to eighty meters direct a set of rays 785 to a third receiving location 730. Between twenty-five and forty meters, heliostats also associated with either the first set or the second set of heliostats are comingled, alternately directing incident radiation to either the first receiving location or the second receiving location. Similarly, between fifty-five and seventy meters, heliostats also associated with either the second set or the third set of heliostats are comingled, alternately directing incident radiation to either the second receiving location or the third receiving location. A first heliostat 752 at about zero meters receives an incident ray 772 and as a result of the Sun angle creates a reflected ray 782 to a receiving location not shown. The second heliostat 754 at about thirty meters receives an incident light ray 774 to create a reflected light ray 784 directed to the second receiving location 720. Also shown, is a third reflector 756 at about fifty-eight meters receiving an incident light ray 776, wherein the heliostat is oriented to provide a reflected ray 786 to the third receiving location 730.

Referring now to FIG. 8, as the Sun angle changes to 60°, a new set of incident light rays 870 create a first set 881 of reflected rays from the associated heliostat group, most of whose heliostats are between about ten and twenty-five meters. Certainly, the incident light rays create a second set of reflected light rays 883 from heliostats place primarily between about forty meters to fifty-five meters. Further, the heliostats positioned from about seventy meters to eighty meters create a third set of reflected rays 885 directed to a third receiving location 830. An aspect of the present invention is shown by comparing the first reflector 745, 854 positioned at about thirty-two meters. When the Sun angle is at 80° elevation the heliostat is oriented to reflect the incident light ray 774 to create a reflected light ray 784 to the second heliostat 720. When the Sun angle moves to a 60° elevation angle, then the heliostat at thirty-two meters 854 is reoriented to accept the incident light ray 874 to create a reflected light ray 884, directed to the first receiving location 810. This process of using a single heliostat to redirect solar radiation from one receiving location to another is an aspect of the present invention referred hereinafter as "handoff" or "dynamic retargeting". In a similar fashion, the third heliostat oriented at about fifty-eight meters 756, 856 receives an incident light ray 776 that creates a reflected light ray 786 directed to the third receiving location 730 when the Sun is at an 80° elevation angle. When the Sun moves to a 60° elevation angle, however, the heliostat 856 is reoriented to reflect the incident light ray 876 via reflected light ray 886 to the second receiving location 820.

As a further demonstration of the "handoff" mechanism of the present invention, as shown in FIGS. 7-9, a first heliostat 752, 852, 952 is positioned at about zero meters. When the Sun angle is at 80° or 60° elevation angle the incident light rays 772, 872 are not reflected to the closest and first receiving location 710, 810. When the Sun angle moves to 40° elevation as shown in FIG. 9, then the heliostat 952 is reoriented to accept the incident light ray 972 and create a reflected light ray 982 back to the first receiving location 910. Accordingly, a heliostat may be dynamically targeted to different receiving locations. Each heliostat is configured to be oriented to a reflector to direct an incident light ray to a specific target receiving location. Whereas this handoff system of the present invention is shown with a single row or bank of heliostats 750, 850, 950, such heliostats would be configured as shown in FIGS. 10-13 and 25, 27.

The handoff algorithm might be very simple or might be very sophisticated. For example, a simple algorithm would be to target each heliostat in an acute-angle reflection system such as to direct reflected radiation to the nearest receiving location that is ±45° in heliostat-relative azimuth from the Sun's azimuth. This simple algorithm is suboptimal in that it will result in excessive blocking of reflected rays for some heliostats at some times.

A more sophisticated algorithm might ensure that each heliostat must target a receiving location with a relative elevation angle less than some threshold value. In general, target selection algorithms might include time, solar position, heliostat location, heliostat characteristics, receiving location, receiver characteristics, weather, system operating state, or other state variables or configuration parameters. The target selection algorithms can be designed to achieve various system objectives, including but not limited to: minimizing heliostat reflector cosine loss, minimizing receiver cosine loss, minimizing heliostat motion, minimizing heliostat wind cross section, minimizing heliostat shadowing, minimizing heliostat blocking of reflected radiation, minimizing concentrated radiation flux variability incident on a receiver, maximizing overall system efficiency, maximizing overall system output power, etc.

Figure 10:
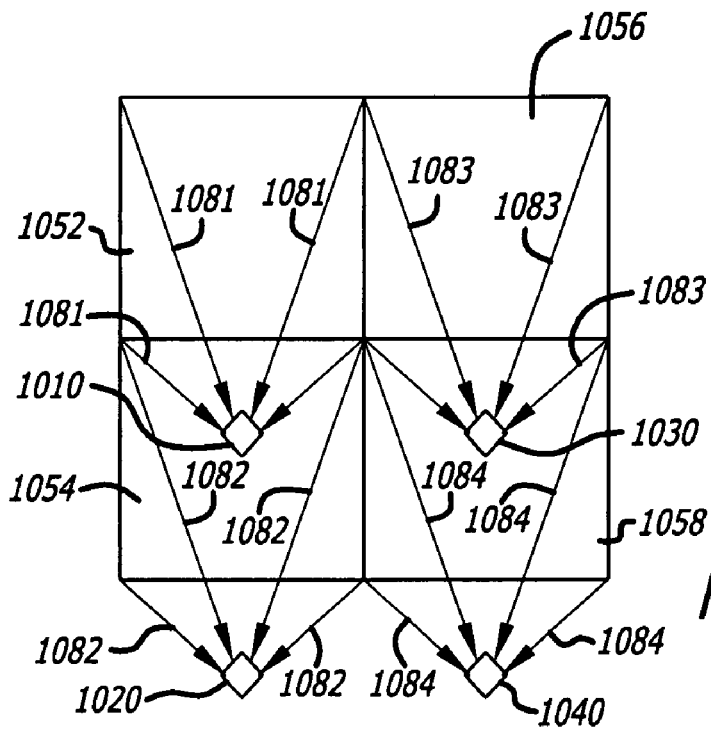
FIG. 10 depicts a plurality of associated heliostat groups directing reflected radiation to a plurality of receiving locations when the Sun is approximately at a 12:00 p.m. position in accordance with the present invention.
Figure 11:
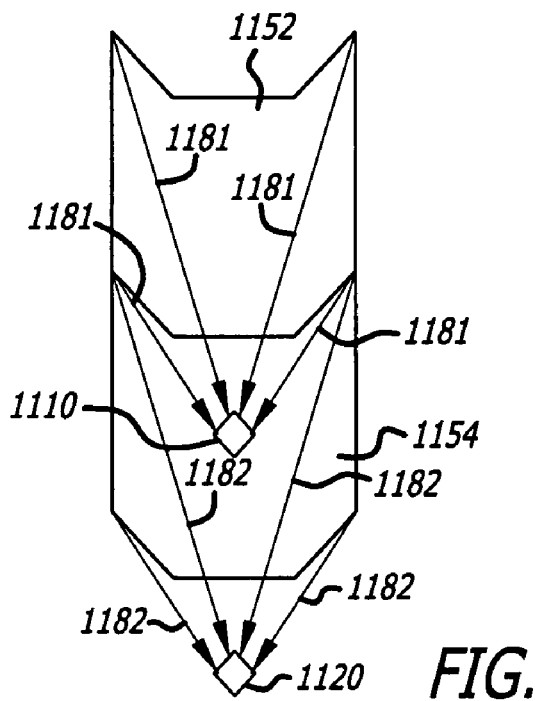
FIG. 11 depicts an alternative set of associated heliostat groups directing reflected radiation to two receiving locations when the Sun is at a 12:00 p.m. position in accordance with the present invention.

Referring now to FIGS. 10-13, another illustration of the hand-off process of the present invention results in a depiction wherein associated heliostat groups appear to rotate around fixed receiving locations. As shown in FIG. 10, heliostats in associated heliostat group 1052 are targeted to receiving location 1010 that lies due north of the receiving location when the Sun is due south, as would be the case for an acute-angle reflection system. The associated heliostat group might be a regular shape, for example, a simple rectangle. The associated heliostat group may assume an irregular shape for various reasons, for example, to minimize the aperture acceptance angle of a receiver or to accommodate site-specific characteristics, as shown in FIG. 11. Indeed, the boundary of each associated heliostat group might be indistinct, overlapping one or more other associated heliostat groups. As shown in FIGS. 7-9, some of the heliostats of two or more adjacent associated heliostat groups may alternate between two or more targeted receiving locations to minimize blocking and/or shadowing. While a similar form of overlapping and alternation of receiver targets is described in the prior art for 2-D concentration (for example, in descriptions of the linear Fresnel concentrator), this technique has not been described for 3-D concentration.

Figure 12:
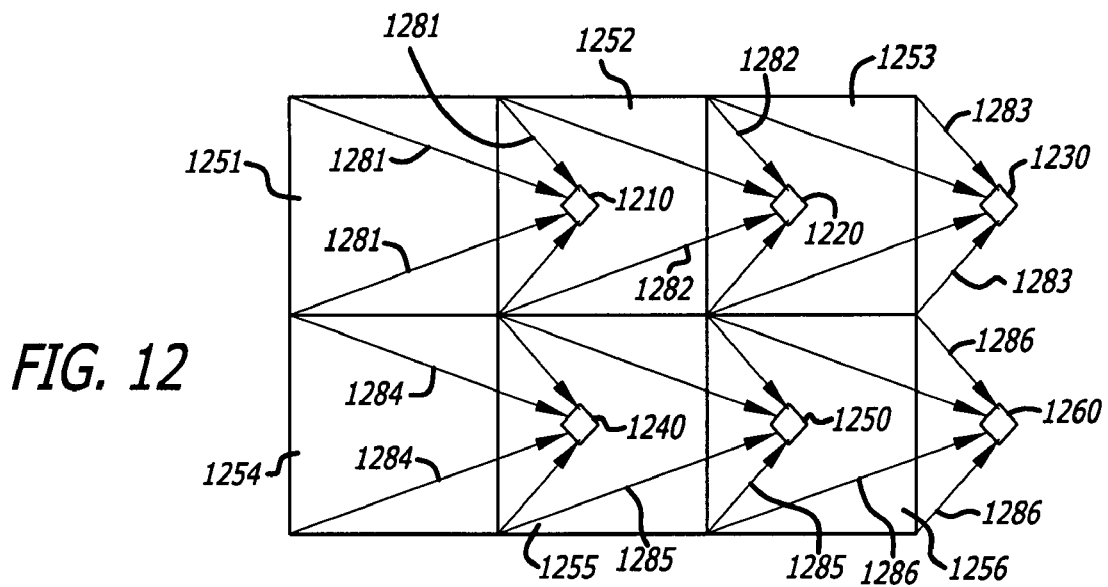
FIG. 12 is a schematic representation of a plurality of associated heliostat groups directing reflected radiation to a plurality of receiving locations when the Sun is at 90° azimuth in accordance with the present invention.
Figure 13:
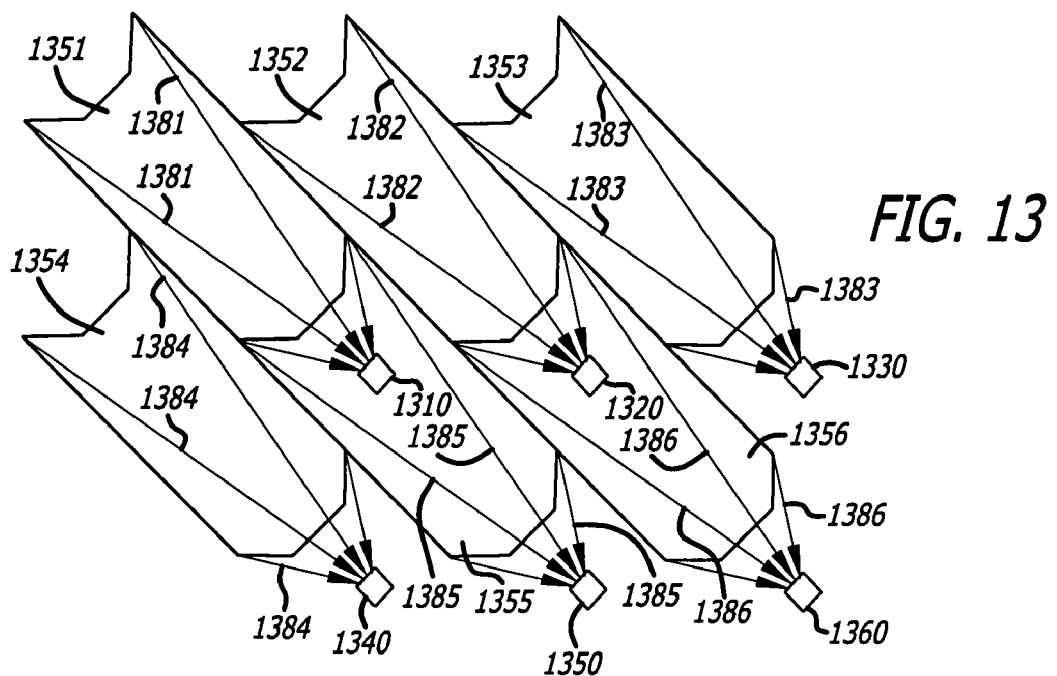
FIG. 13 depicts a plurality of associated heliostat groups directing reflected radiation to a plurality of receiving locations when the Sun is at 135° azimuth in accordance with the present invention.

FIG. 12 shows how a very different set of heliostats would be targeted to form the associated heliostat group 1251 for receiving location 1210 when the Sun is due east (for example, shortly after sunrise at the equinox). With respect to a single receiving location, 1010/1210, the square associated heliostat group, now located due west of the receiving location, appears to have rotated around the receiving location. Conceptualizing operation thusly might be useful, for instance to observe that the two associated heliostat groups have similar relationships to the Sun despite the latter's very different azimuthal position, but the heliostats are certainly fixed to the Earth in static locations. Only the dynamic targeting of heliostats to a particular receiving location creates the effect of an associated heliostat group appearing to "rotate" around the receiving location. Similarly, FIG. 13 shows associated heliostat groups for an azimuth of 135° (southeast). As described further herein, these examples assume acute-angle reflection heliostats; however, the same concept can be applied to oblique-angle reflections.

Although the there is no physical change of the position of heliostats around a receiving location, the apparent rotation of an associated heliostat group around the receiving location results in a very real rotation around the receiving location of the principal direction of radiation incident upon the receiving location. With reference to FIG. 10-13, the changing position of an associated heliostat group 1251, 1351, 1052 in an acute-angle reflection system will result in a receiving location 1210, 1310, 1010 having light rays 1281 arrive from 270° azimuth when the Sun is at 90° azimuth, having light rays 1381 arrive from 315° azimuth when the Sun is at 135° azimuth, and having light rays 1081 arrive from 360° (0°) azimuth when the Sun is at 180° azimuth. A similar phenomenon will be observed in an oblique-angle reflection system. For a system located at 35° latitude (for example, at Barstow), a system must accommodate incident radiation arriving at each receiving location through an angle of as much as 310° to be capable of receiving light rays from sunrise to sunset on the summer solstice.

For some receiver technologies, the ability to accommodate varying angles of incident radiation is intrinsic. For example, the prior art describes thermal receivers that can receive solar radiation from 360°. Such receivers would lose efficiency, however, due to losses from the side opposite the received solar radiation. In systems using such receivers, a moveable element might be added to each receiver that provides a rotating aperture that accepts solar radiation from a preferred but changeable direction and that prevents energy loss in other directions.

Photovoltaic receivers might rotate a photovoltaic converter assembly ("solar panel") or might rotate a secondary optical element relative to a fixed photovoltaic converter assembly. In one embodiment of the present invention, the photovoltaic converter assembly is mounted on a structure capable of moving the center of the converter assembly's aperture through 315° rotation in azimuth. In this embodiment, power cables and coolant fluid plumbing are provided with service loops sufficient to allow the required range of motion and the rotation limitation provides a limit to how much motion the cables and plumbing must accommodate. Alternatively, but without limitation, the required power and coolant transfer might use slip rings for electrical connections and rotating ball-joint couplings for fluid connections. In another embodiment of the present invention, the photovoltaic converter assembly is mounted in a fixed position with its aperture pointing upwards. In this embodiment, a secondary optical assembly is mounted on a structure capable of moving the center of the optical assembly's aperture through 315° rotation in azimuth. In this embodiment, the optical assembly provides secondary concentration, beam homogenization, and redirection of radiation incident upon the secondary optical aperture to the concentrator assembly. In this embodiment, power and coolant connections do not need to accommodate movement of the converter assembly.

These described embodiments are not limiting on the application of the present invention. The moveable members (whether the converter assembly or the secondary optical element) might provide two axes of motion (for example, in both azimuth and elevation). The range of motion provided for the moveable members might be greater than or less than the 315° in azimuth described, and might range from no motion in elevation to 180° in elevation. The secondary optics might use a variety of optical methods (for example but not limited to, a compound parabolic concentrator, a non-imaging refractive optic, or other means known to the art).

Figure 14:
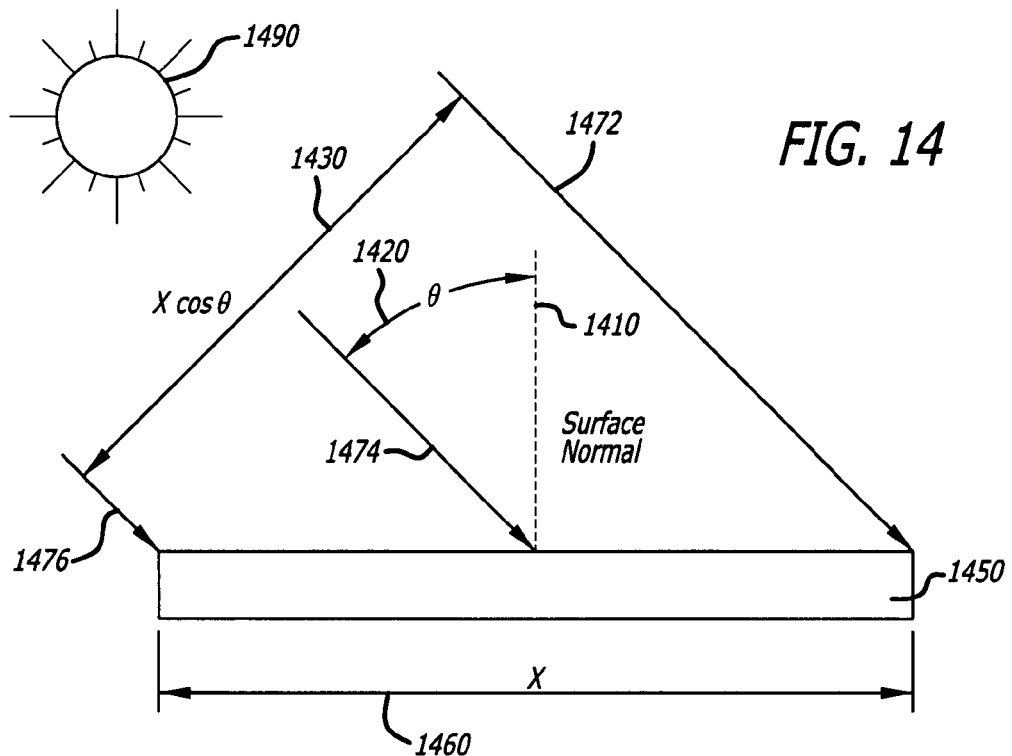
FIG. 14 is a schematic representation of a reflecting surface depicting cosine loss effect.

A reflector that is tilted at any angle away from the Sun will exhibit what is termed "cosine loss". More precisely, a reflector having a given reflecting area will exhibit a loss of effectiveness proportional to one minus the cosine of the angle between the reflecting surface and the incident solar radiation. For example, referring now to FIG. 14, a mirror 1450 having an aperture dimension X 1460 exposed to light rays 1472, 1474, 1476 arriving from the Sun 1490 at an angle of θ 1420 relative the mirror's surface normal 1410 will intercept solar radiation 1472, 1474, 1476 through an effective aperture 1430 that is only (X cos θ) wide, a relative loss of (one minus cos θ).

Figure 15:
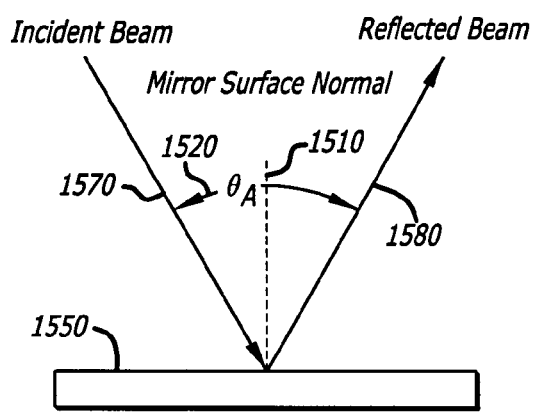
FIG. 15 depicts a schematic representation of an acute-angle reflection.
Figure 16:
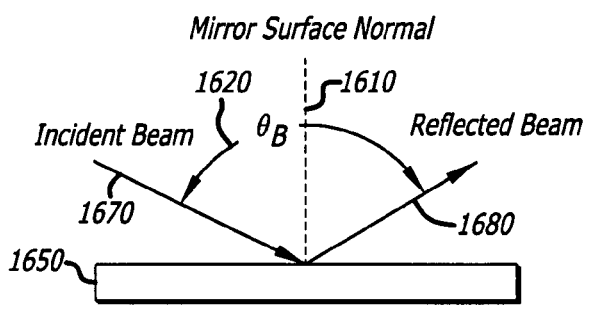
FIG. 16 depicts a schematic representation of an oblique-angle reflection.

Referring now to FIGS. 15-19, an incident light ray 1570, 1670 reflected from a reflector 1550, 1650 (for example, a mirror) will become a reflected light ray 1580, 1680 that leaves the reflector surface at the same angle relative to the reflector surface normal 1510, 1610 as the incident light ray in accordance with Snell's law of reflection. As shown in FIG. 15, when the angle $\theta_A$ 1520 between the incident beam 1570 and reflected beam 1580 is less than 90°, the phenomenon may be termed an "acute-angle reflection." As shown in FIG. 16, when the angle $\theta_B$ 1620 between the incident beam 1670 and reflected beam 1680 is greater than 90°, the phenomenon may be termed an "oblique-angle reflection." These terms are used in this fashion herein.

Figure 17:
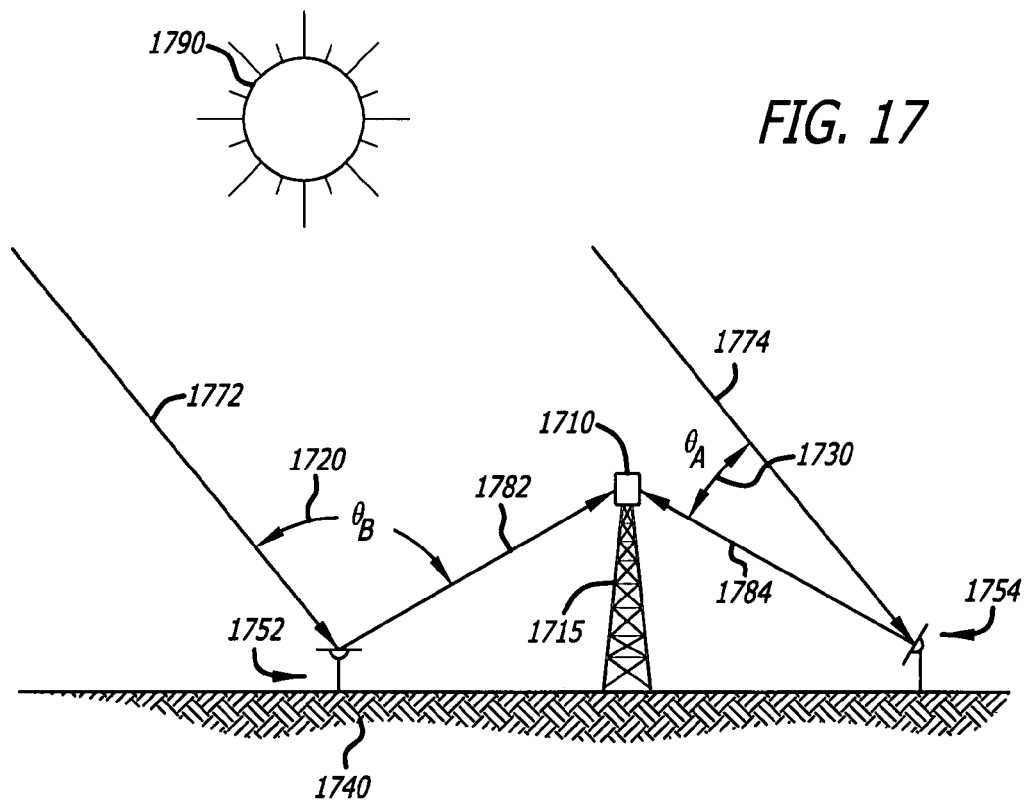
FIG. 17 is a schematic representation showing oblique-angle and acute-angle reflections to a common receiving location.
Figure 18:
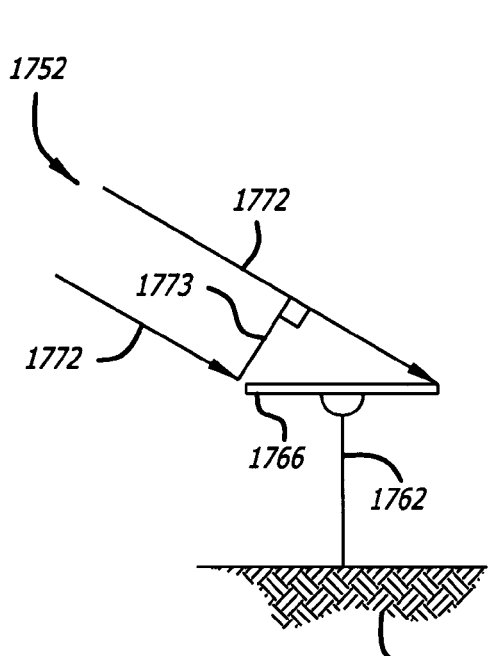
FIG. 18 depicts cosine loss for a heliostat oriented for oblique-angle reflection.
Figure 19:
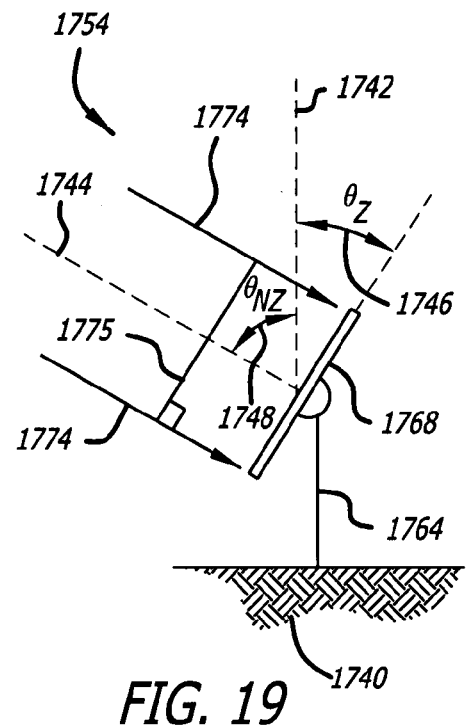
FIG. 19 depicts cosine loss for a heliostat oriented for acute-angle reflection.

As shown in FIG. 17, a receiving location 1710 on a tower 1715 is fixed to the ground or other surface 1740. The receiving location is positioned between an oblique-angle heliostat 1752 and an acute-angle heliostat 1754. The Sun 1790 provides incident solar radiation 1772, 1774 to the heliostats, which direct reflected rays 1782, 1784 to the receiving location. The angle between the incident ray 1772 to the oblique heliostat 1752 and its reflected ray 1782 may be referred to as $\theta_B$ 1720 and by the previous definition of oblique-angle is greater than 90°. Similarly, the acute angle $\theta_A$, measured as the angle between the solar radiation 1774 incident upon the acute-angle heliostat 1754 and its reflected light ray 1784 to the receiving location 1710, is less than 90°. As shown in FIG. 18, the effective area of an oblique-angled heliostat 1752 is shown by the incident ray 1772 upon the reflecting surface 1766 which is mounted on a supporting portion 1762 fixed to the earth 1740 or other surface. The effective area of the reflecting surface 1766 is relatively represented by a perpendicular line 1773 to the incident rays. As shown in FIG. 19, the effective aperture of the incident solar radiation rays 1774 upon the reflecting surface 1768 of an acute-angled heliostat secured to the ground by a support structure 1764 may be represented by a line 1775 perpendicular to the incident rays impinging on the reflecting surface 1768 of the acute-angled heliostat.

Referring now to FIG. 19, a zenith angle is defined to be the angle that any vector or surface makes with the zenith 1742. In FIG. 19, heliostat reflector 1768 makes an angle $\theta_Z$ 1746 with respect to the zenith 1742, and heliostat reflector normal 1744 makes an angle $\theta_{NZ}$ 1748 with respect to the zenith 1742. The zenith angle of a vector is equal to 90° minus the elevation angle of that vector.

Figure 20:
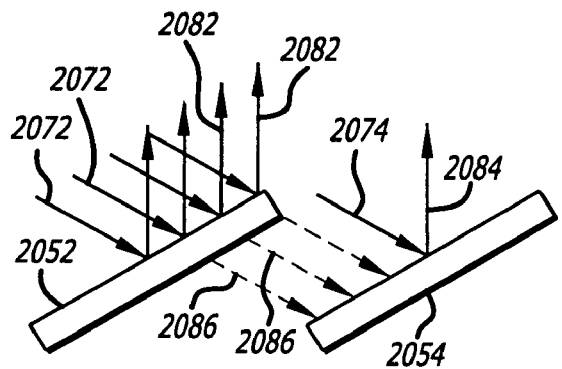
FIG. 20 is a schematic representation of two reflecting surfaces depicting shadowing of one reflecting surface by another (reflecting) surface.
Figure 21:
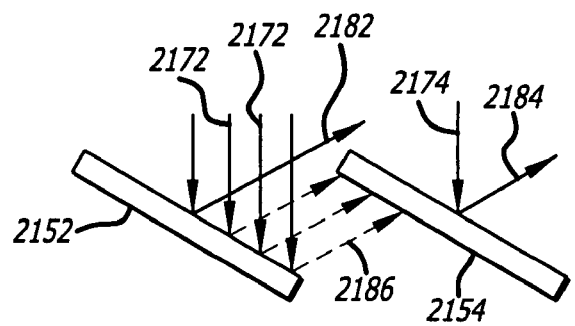
FIG. 21 is a schematic representation of two reflecting surfaces depicting one surface blocking light rays previously reflected by one reflecting surface.
Figure 22:
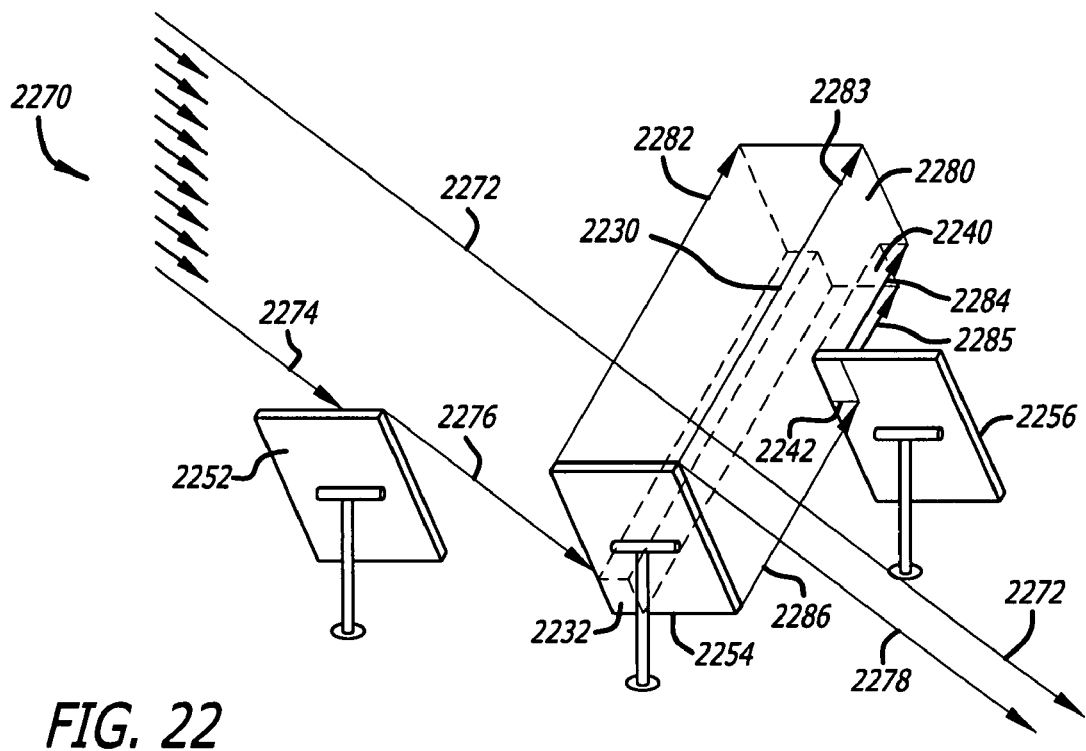
FIG. 22 is a schematic representation depicting blocking and shadowing amongst a plurality of heliostats.

Referring now to FIGS. 20-22, shadowing of reflectors and blocking of reflected light by other heliostat reflectors results in a need to space the heliostats to avoid these issues. Shadowing and blockage decrease utilization of heliostats and thus have indirect costs. The typical spacing of heliostats in prior art central receiver systems leads to relatively low land-use efficiency. Increasing heliostat spacing also increases losses due to atmospheric path-length absorption and beam spread losses. When light rays are blocked, a shadow is cast. Some of the concepts described herein must distinguish between these two similar types of obscuration.

FIG. 20 illustrates "shadowing". Incident light rays 2072, 2074 reflected by two mirrors 2052, 2054 become reflected light rays 2082, 2084. A first mirror 2052 (or any other opaque object) creates a shadow 2086 by preventing some light rays 2072 from reaching a second mirror 2054 (or any other object of interest). As used hereinafter, "shadowing" will be used only to describe this effect on the second mirror 2054. An object "shadows" another only when the first object is the first one to intercept the Sun's rays.

FIG. 21 illustrates "blocking". Light rays 2172 incident on a first mirror become reflected light rays 2182, 2186 but some of the reflected light rays 2186 are "blocked" by a second mirror 2154 (or any other opaque object), thereby preventing this light from reaching a receiving location (or any other device in the system). Light rays 2174 incident on the second mirror become reflected rays 2184 that can be utilized, but the second mirror decreases the overall system efficiency because it blocks light reflected by the first mirror. As used hereinafter, "blocking" will be used only to describe this effect by the second mirror. An object is said to "block" another when the object prevents the Sun's rays from being further used in the system.

As shown in FIG. 22, the primary distinction between shadowing and blocking is that a shadowing object can still allow solar radiation to be used effectively, while a blocking object prevents that light from being used. Blocking always results in a loss. Shadowing might or might not result in loss. Depending on how a plurality of heliostats 2252, 2254, 2256 are positioned in relation to the incident sunlight radiation 2270 and a receiving location (not shown), shadowing or blocking may occur. For example, a portion of the incident radiation such as a group of light rays 2274 may impinge on a corner of a first heliostat 2252 that causes a shadow 2276 upon a portion 2232 of a second heliostat 2254 causing a reduction 2230 in the total reflected radiation 2280 than might otherwise be available by reflected beams 2282, 2283 from the second heliostat. Shadowing can occur when one or more portions of the reflected radiation 2286 are intercepted by a portion 2242 of another heliostat causing a blocked area 2240 bounded by certain reflected rays 2284, 2285 from the reflecting surface of the third heliostat 2256. Shadowing might also occur when incident radiation 2270 is intercepted 2278 by a heliostat whereas incident radiation moving between the heliostats 2272 would not be shadowed.

Figure 23A:
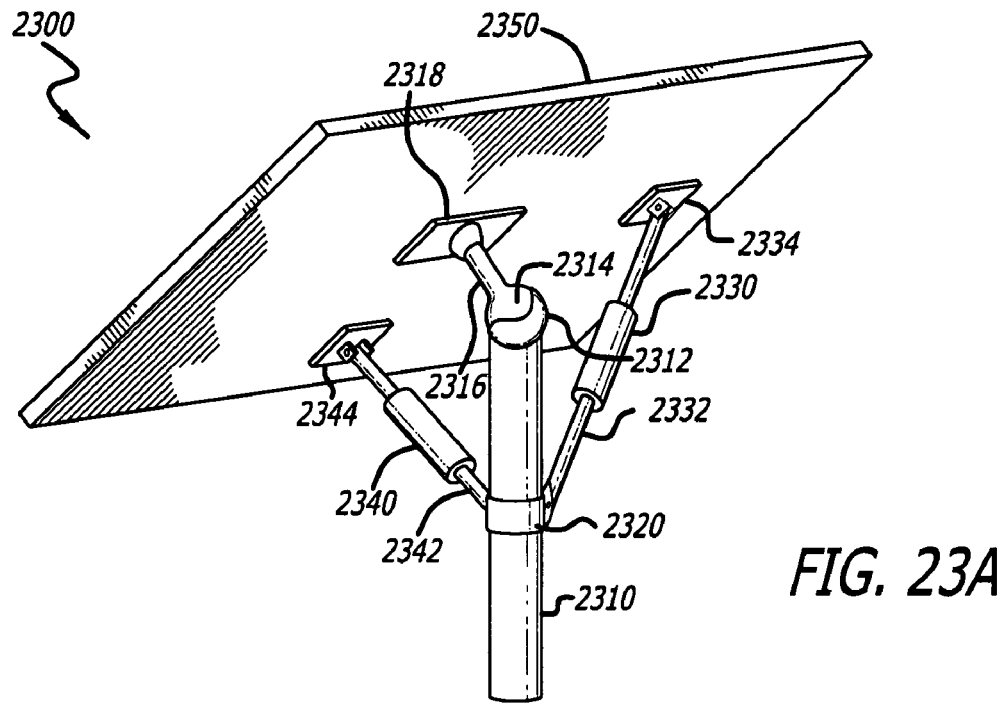
FIGS. 23A-23C depict an embodiment of a heliostat of the present invention.
Figure 23B:
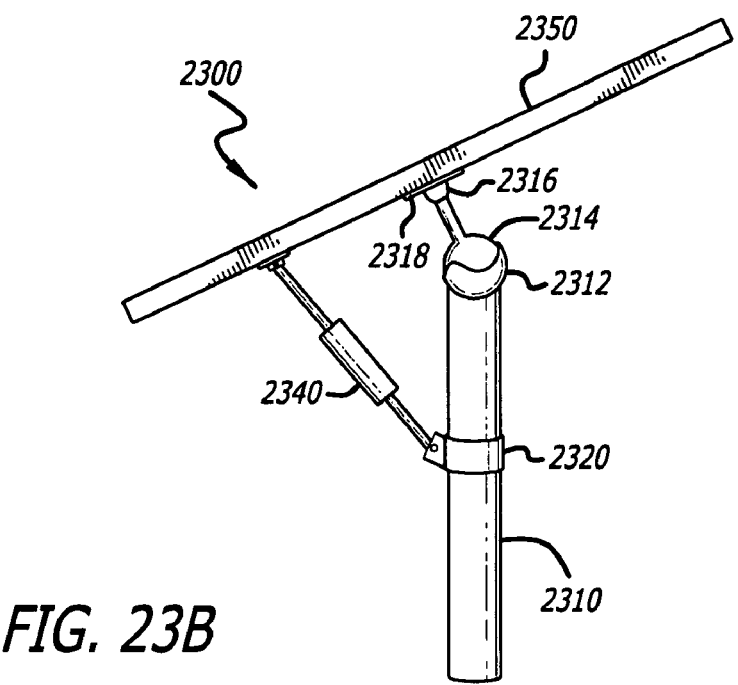
Figure 23C:
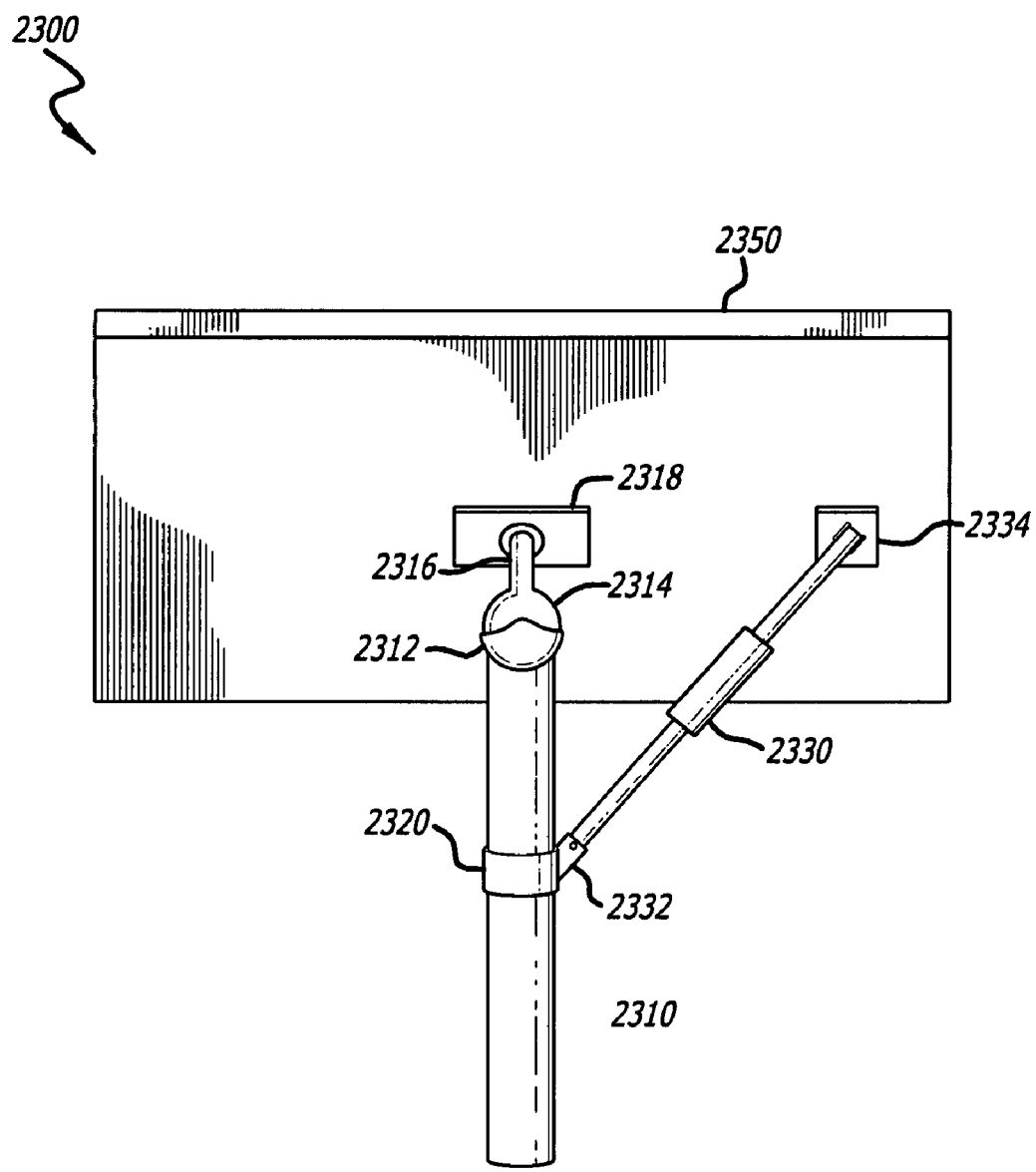

Referring now to FIGS. 23A-23C, the present invention could use any type of heliostat design. For example U.S. Pat. No. 4,276,872, which is hereby incorporated herein in its entirety by reference, provides a description of a typical heliostat implementation, illustrated simplistically in FIG. 4. In the present state-of-the-art, heliostat fields comprise a substantial fraction of the cost of a solar power generation plant. An aspect of the solar power generation system of the present invention is that it allows much simpler heliostats to be designed that can be cheaper to produce. The simplification of heliostat design proceeds from the observation that in a solar power system that relies exclusively on oblique-angle reflection, the range of motion required of the heliostats is greatly diminished compared with a prior art az-el mount. Further, because the required range of motion can be limited such that the reflector surface of each heliostat remains relatively parallel to the ground (much more so than in prior art central receiver systems), the aerodynamic cross section presented by the reflector assembly to winds is greatly diminished. A heliostat designed to accommodate this consequently reduced wind load can provide opportunities for reducing manufacturing cost.

As shown in FIGS. 23A-23C, two different configurations of a heliostat 2300 are envisioned. In the first, a two-axis joint 2312, 2314 (for example, a ball head, two-axis gimbal, or flexure) supports the reflector assembly 2350 at one point while two linear actuators 2330, 2340 (for example, ball screw actuators) are placed appropriately, both to provide two-axis control (rotations around the aforementioned two-axis joint) and to provide additional mechanical support for the reflector assembly 2350. The heliostat assembly includes a support mechanism such as a pole having an anchoring mechanism (not shown) for securing the heliostat to the ground or other support structure. The top or upper end of the pole includes the two axis joint such as a socket 2312 and ball 2314 mechanism. The joint is connected to the reflector mechanism by a rod 2316 or similar mechanism connected (attached) to a plate or securing device 2318 to attach the movable portion of the joint to the reflector. A first actuator mechanism 2330 is connected to the support mechanism 2310 at an attachment point 2320 by a connector, rod or strut 2332. The first actuating mechanism is connected to the reflector assembly at a plate or securing device 2334. The second actuator 2340 has a connector 2342 secured to the attachment point 2320 on the support structure 2310. The second actuator is connected to the reflector 2350 by a securing device 2344. In environments where dust or other materials may corrode or degrade the performance of the joint or actuator mechanisms, protective coverings or boots (not shown) may be incorporated into the heliostat. The actuating electronics 2320 may include a microprocessor and other electronics for communicating with sensors and other devices as heretofore described regarding prior art heliostats (see FIG. 4).

In the second configuration, the two-axis joint is replaced by a third linear actuator. This configuration, while more expensive, provides additional range of motion and fault tolerance. The economic value of these features would have to be determined by a trade study.

In one aspect of the present invention, oblique-angle reflectance is used because it allows a heliostat design that uses limited-motion linear actuators. Instead of implementing an az-el mount with a sturdy single-pivot azimuth bearing, the substantially reduced range of motion afforded by the present invention allows linear actuators to be used in a tripod configuration. A three-point support arrangement provides structural stability for each reflector assembly at three locations, rather than a single (generally central) point. Such a design can provide higher stiffness with equivalent precision and control to the central-pivot actuators that are currently used but at much lower cost. The control angle range of motion required in each axis for oblique-angle reflectance with the receiving location selection method of the present invention is significantly smaller than that of a traditional heliostat design.

Oblique-angle reflectance heliostats will generally present a lower wind cross-section and would thus be more amenable to placement on buildings, thereby allowing the present invention to be used to generate industrial process heat and power on site (co-generation capability). If only oblique-angle reflection is used, more reflector area is required to intercept and redirect the same solar power due to the larger cosine loss of the oblique mirrors (relative to using acute-angle reflection). In one embodiment of the present invention, this cost is offset by using smaller (and thus more rigid) flat-plate reflectors that are far cheaper than the complex structures typically used in state-of-the-art heliostats. If the economics are such that acute-angle reflection is preferred, then the present invention can still be used.

Figure 24:
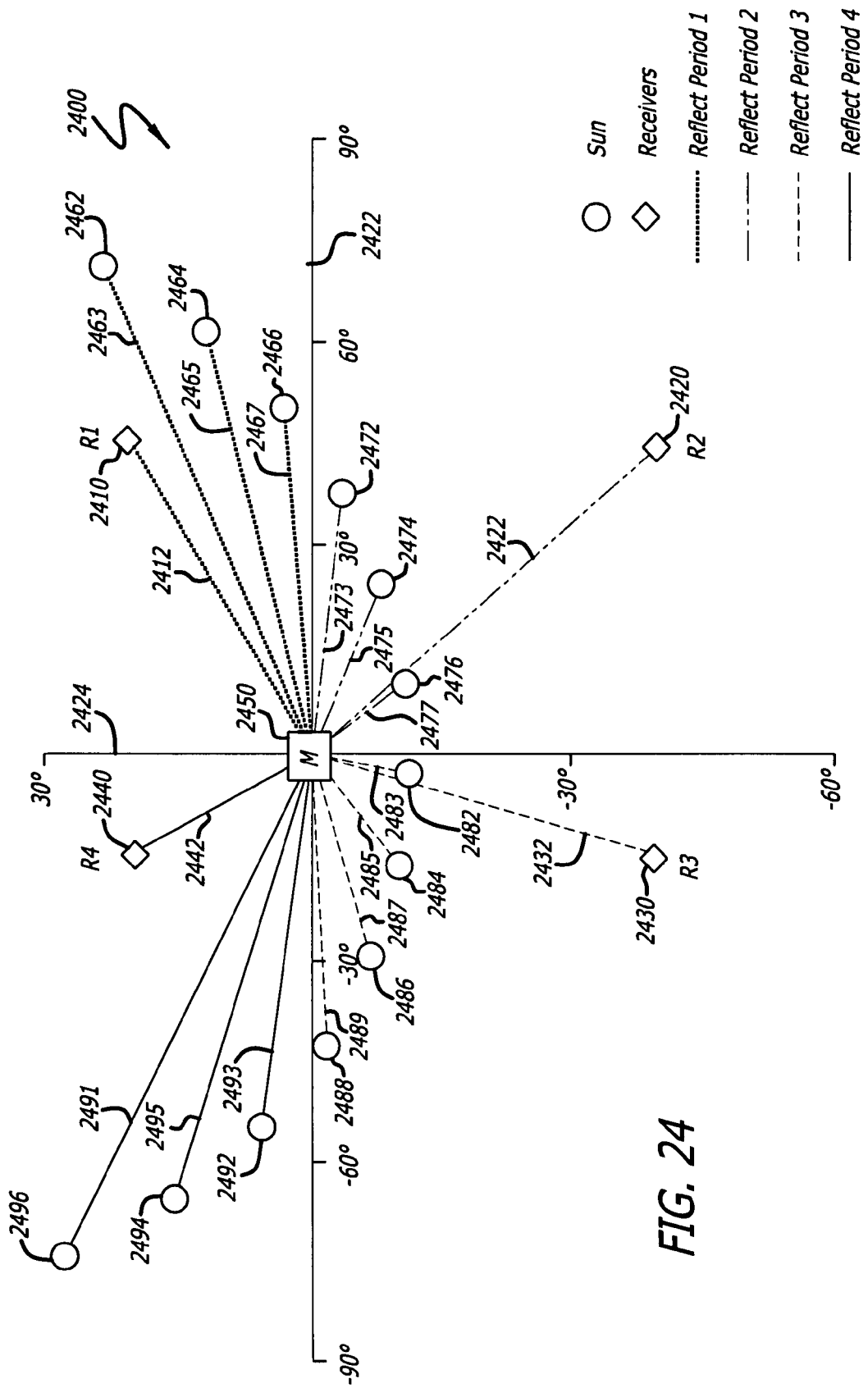
FIG. 24 is a schematic representation depicting handoff among multiple receiving locations with acute-angle reflectance in accordance with the present invention.
Figure 25:
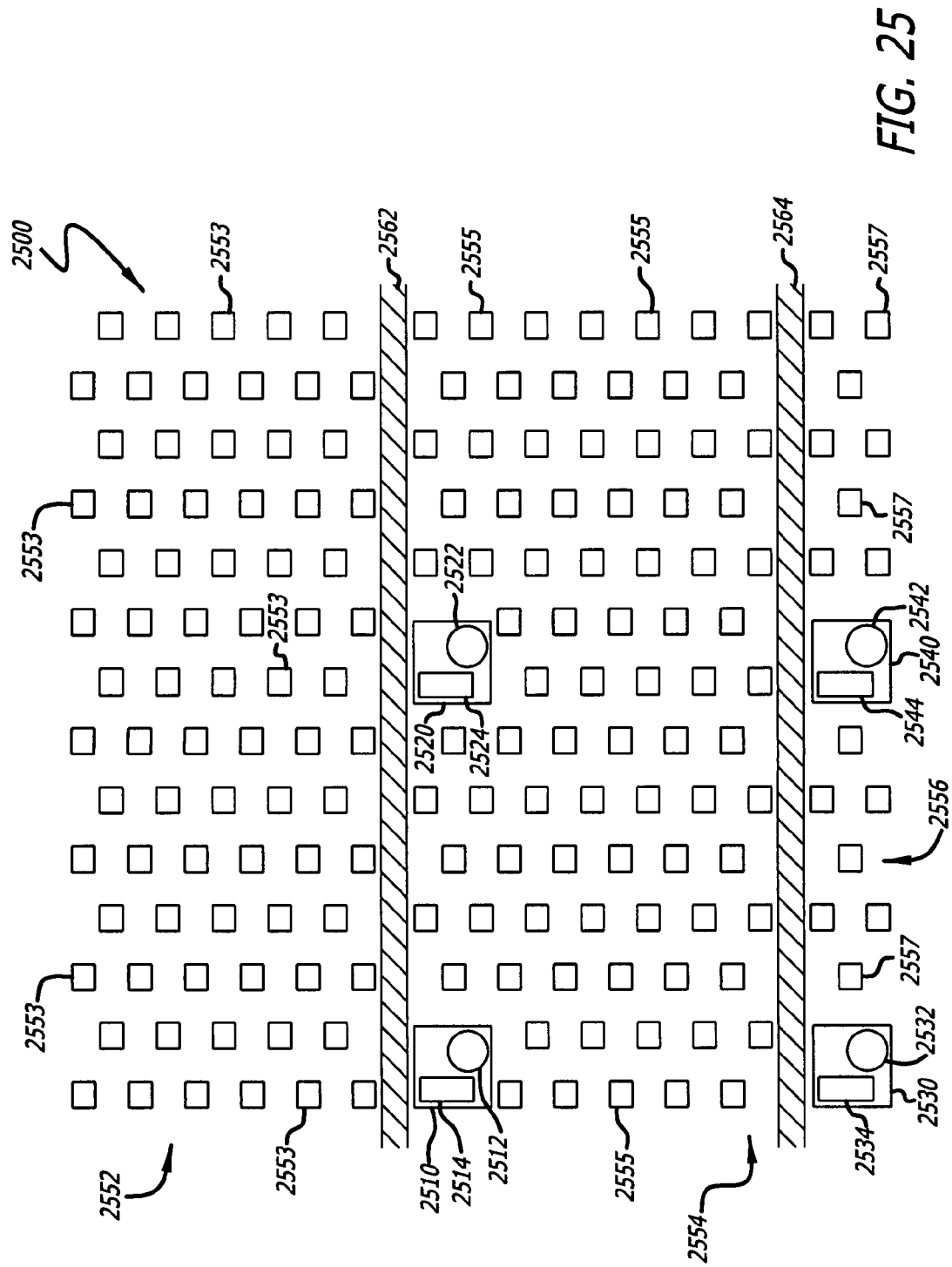
FIG. 25 is a schematic representation of a site layout having a sparse heliostat array for acute-angle reflections in accordance with the present invention.

Referring now to FIG. 24, the system of the present invention includes a plurality of receiving locations, 2410 (R1), 2420 (R2), 2430 (R3), 2440 (R4) which are positioned amongst a heliostat field, a single one of which is depicted by heliostat 2450 (M). In one embodiment, the receiving locations are placed in a rectangular grid, as shown, but may be arranged in a triangular pattern. Receiving locations may be arranged in many other ways, not necessarily limited to simple geometric patterns. In this embodiment, the heliostat 2450 is configured to control its associated reflector for acute-angle reflection, wherein incident radiation is reflected as nearly as possible back towards the Sun to a particular receiving location as determined by the method of the present invention. As an aspect of this embodiment of the present invention, each heliostat in an associated heliostat group is driven in such a way that the receiving location is always generally between the Sun and the middle of the associated heliostat group, only one member of which is indicated by heliostat 2450. As shown in FIG. 25, an embodiment of a concentrating solar power plant 2500 arranged to utilize acute-angle reflection includes heliostat subfields 2552, 2554, 2556 each containing a plurality of heliostats 2553, 2555, 2557 divided by service roads 2562, 2564. The receiving locations 2510, 2520, 2530, 2540 are positioned at various locations. In this embodiment, the heliostats in the heliostat field have reflectors two meters square and are spaced approximately four meters apart in a generally staggered but rectangular fashion. Other configurations of the heliostat field may be configured as discussed but are not limited by the embodiments and examples disclosed herein.

FIG. 24 illustrates, as a non-limiting example, a handoff sequence for Sun positions on summer equinox as viewed from Barstow. For example, a first reflect period may include the Sun positions at 6:00 a.m. 2462, 7:00 a.m. 2464 and 8:00 a.m. 2466 that provide incident light rays 2463, 2465, 2467 to the reflector of the heliostat 2450 which, due to the acute-angle orientation of the reflector, are directed to a first receiving location 2410 (R1) depicted by reflected ray 2412. The handoff algorithm in this example is defined such that each heliostat in the associated heliostat group directs incident solar energy to the first receiving location 2410 until the reflection angle required to direct solar radiation to the first receiving location 2410 is greater than would be required to direct solar radiation to a second receiving location 2420. Such a handoff algorithm will target heliostats to receiving locations in such a way as to form an associated heliostat group of heliostats grouped such that the associated receiving location is between the Sun in the middle of the receiving location's associated heliostat group. The heliostat 2450 is dynamically retargeted from receiving location 2410 to a second receiving location 2420 (R2) as depicted when the Sun moves from position 2466 at 8:00 a.m. to Sun position 2472 at 9:00 a.m. This process will transfer the heliostat from the associated heliostat group of the first receiving location 2410 to the associated heliostat group of the second receiving location 2420. Note that an embodiment might or might not explicitly define associated heliostat groups. The association might be nothing more than "the group of all heliostat object instances (in an object-oriented software implementation) whose target receiving location variable has the same value." Thereafter, when the Sun is at positions 9:00 a.m. 2472, 10:00 a.m. 2474 and 11:00 a.m. 2476, incident light rays 2473, 2475, 2477 are directed by the heliostat to the second receiving location 2420 (R2). Similarly, as the Sun moves to the later day positions of noon 2482, 1:00 p.m. 2484, 2:00 p.m. 2486 and 3:00 p.m. 2488, the incident light rays 2483, 2485, 2487, 2489 are directed to the heliostat 2450 and back to a third receiving location 2430 (R3) via reflected ray 2432. As the Sun begins to set, it moves from 4:00 p.m. 2492, 5:00 p.m. 2494 to 6:00 p.m. 2496, the incident light rays 2493, 2495, 2497 and the heliostat 2450 is dynamically retargeted to direct its reflected light rays 2442 to a fourth receiving location 2440 (R4). Thus, as the Sun moves across the celestial sphere, the system of the present invention determines when to dynamically retarget the target of each heliostat to "handoff" targeting from one receiving location to another in the most efficient manner according to some objective function.

Figure 26:
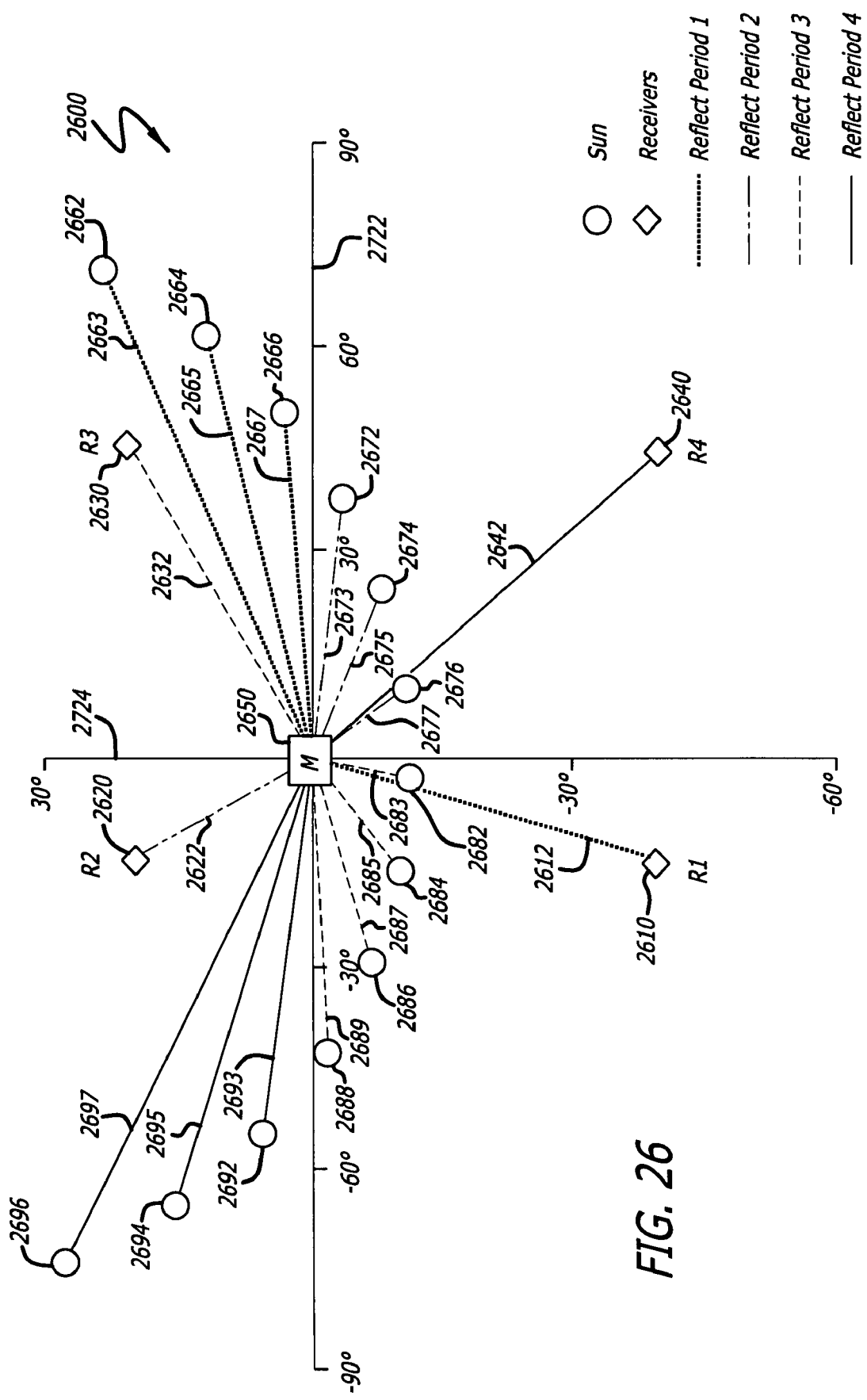
FIG. 26 is a schematic representation depicting handoff among multiple receiving locations with oblique-angle reflectance in accordance with the present invention.
Figure 27:
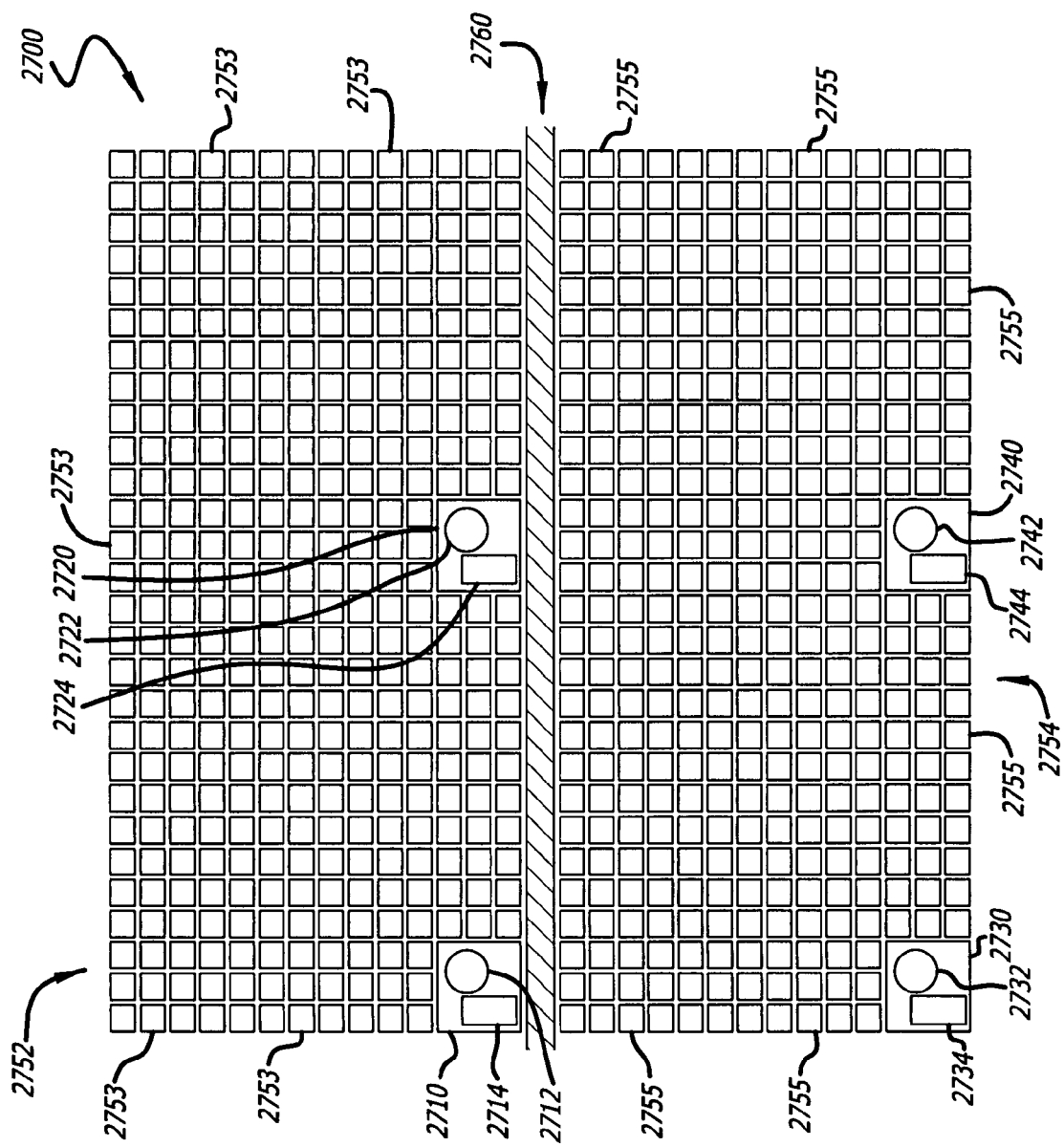
FIG. 27 is a schematic representation of a site layout having a dense heliostat array for oblique-angle reflectance in accordance with the present invention.

Referring now to FIG. 26, a plurality of receiving locations 2610 (R1), 2620 (R2), 2630 (R3) and 2640 (R4) are positioned amongst a heliostat field that may be densely configured due to the oblique-angle usage of representative heliostat 2650 (M). As shown in FIG. 27, the heliostat field 2700 may be divided into subfields 2752, 2754 by service roads 2760. Each subfield of heliostats or reflectors 2753, 2755 may surround or otherwise contain power generation stations 2710, 2720, 2730 and 2740, having receiving locations atop towers 2712, 2722, 2732, 2742 and other infrastructure buildings 2714, 2724, 2734, 2744. Such power generation systems may utilize photovoltaic and/or thermal generation means.

As shown in FIG. 26, when a heliostat 2650 is configured for oblique-angle reflection, the heliostats are targeted to receiving locations in such a way that the middle of each receiving location's associated heliostat group associated with a given target receiving location, which is dynamically configured, is always generally between the Sun and the target receiving location. For example, as the Sun moves from 6:00 a.m. 2662 (again, shortly after summer solstice sunrise at Barstow as a non-limiting example) to 7:00 a.m. 2664 to 8:00 a.m. 2666, the incident light rays of energy from the Sun 2663, 2665, 2667 are directed from the heliostat to a first receiving location 2610 (R1), creating reflected rays 2612. As the Sun moves later in the morning (for example, at 9:00 a.m. 2672, 10:00 a.m. 2672, 10:00 a.m. 2674 and 11:00 a.m. 2676) incident light rays 2673, 2675, 2677 are directed by the heliostat 2650 to a second positioned receiving location 2620 (R2), resulting in reflected light rays 2622. Thus, as the Sun moves across the sky, the system of the present invention determines when and where to "handoff" the incident light rays to a receiving location in the most efficient manner according to some objective function (different from one that might be used in a system utilizing of acute-angle reflection).

Similarly, as the Sun position changes from 12:00 2682, to 1:00 p.m. 2684, to 2:00 p.m. 2686, to 3:00 p.m. 2688, then light rays 2683, 2685, 2687, 2689 incident on the reflector of heliostat 2650 are directed by the heliostat 2650 to become reflected light rays 2632 that are directed to a third receiving location 2630. Toward sunset, the Sun position changes from 4:00 p.m. 2692, to 5:00 p.m. 2694, to 6:00 p.m. 2696, and incident light rays 2693, 2695, 2697 are directed by the heliostat 2650 to travel as reflected rays 2642 to a fourth receiving location 2640 (R4). In this embodiment of the present invention, the group of heliostats in a heliostat field 2752, 2754 (see FIG. 27) that are driven to direct incident radiation to the same target receiving location (for example, 2630) will form an associated group whose middle is always generally between Sun and the target receiving location.

As shown in FIG. 25, a heliostat field 2500 configured using primarily acute-angle reflections may result in a heliostat field wherein the density of the heliostats 2553, 2555, 2557 would be relatively sparse. The heliostat field may be divided into subfields 2552, 2554, 2556 by service roads 2562, 2564 or other dividing mechanisms. The power system mat additionally contain a plurality of receiving locations 2510, 2520, 2530, 2540 each having a receiver tower 2512, 2522, 2532, 2524 and a power generation and transmission infrastructure 2514, 2524, 2534, 2544. An arrangement of this type might generally be expected to have the lowest cost for the heliostat field and to produce power at a fairly constant level throughout the day. This approach is similar to the prior art inasmuch as it relies heavily on a sparse heliostat field and primarily acute-angle reflection but, as described herein, more efficiently utilizes its heliostats.

As shown in FIG. 27, a heliostat field 2700 configured using only oblique-angle reflections 2753, 2755 can be relatively dense. The heliostat field may be divided into subfields 2752, 2754 by a road 2760 or other dividing mechanism. A plurality of receiving locations 2710, 2720, 2730, 2740 are located or positioned within the subfields amongst the heliostats and each contains a receiver tower 2712, 2722, 2732, 2742 and power generation and transmission infrastructure 2714, 2724, 2734, 2744. This arrangement might produce the most energy within a given real-estate footprint and could allow the use of limited-motion heliostats such as described herein with reference to FIG. 23.

FIG. 24 and FIG. 26 should be considered to be representative applications of the present invention, rather than mutually exclusive. Certainly, the heliostat field could be configured to utilize a combination of acute-angle and oblique-angle reflections. For example, a heliostat pattern that partially surrounds each receiving location might be implemented to limit atmospheric transmission losses. Such a pattern would be expected to use a combination of combination of acute-angle and oblique-angle reflections, and the shape of the dynamically-targeted associated heliostat group for a specific receiving location would appear to rotate around that receiving location.

Figure 28A:
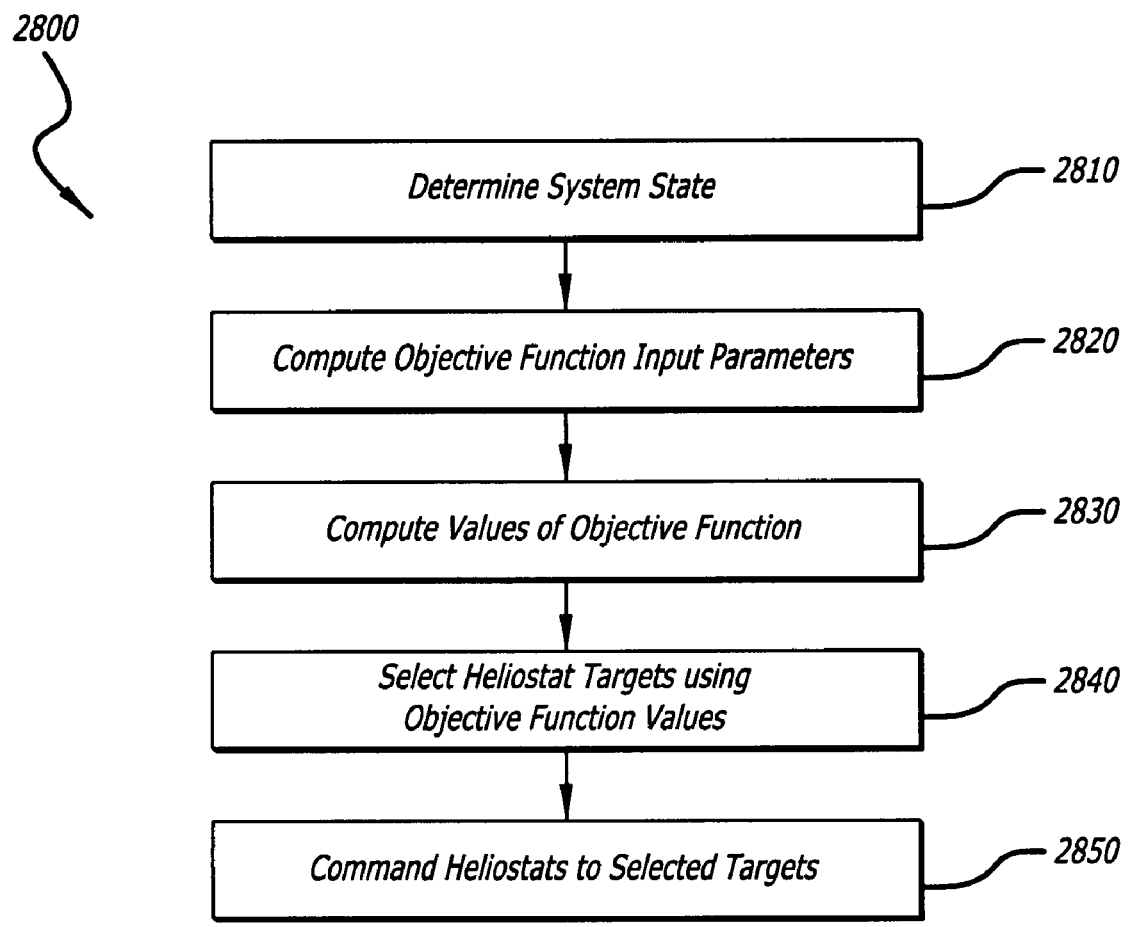
FIGS. 28A-28B depict flow charts of the present invention for heliostat targeting to a plurality of receiving locations in accordance with the present invention.

A method in accordance with the present invention for selecting for a given heliostat to determine which receiving location to target is described with reference to FIG. 28A and in more detail to FIG. 28B. The targeting of heliostats to receivers depends on determining the values of various state variables, the values of various intermediate values to be used as inputs to an objective function, the values of the objective function for various considered options, and a step of selecting a target receiving location based on the various computed values of the objective function.

The first general step 2810 of the method is determine the values of various state variables, wherein "state variable" is taken to mean a variable which represents part of the state of a system or its environment. Such state variables might include but are not limited to: the time of day; the season of the year; the Sun's position; the transmissivity of the atmosphere; the local weather; the local atmospheric temperature; the local wind speed; the temperature of each receiver; the number of heliostats directing solar radiation to each receiver; the current commanded orientation of each heliostat; the measured orientation of each heliostat; heliostat cleanliness. Generally but without limitation, a state variable's value is determined by measurement (using, for example, a Sun sensor, a thermometer, anemometer, a rotary angle encoder using the approach taught by U.S. Pat. No. 2,685,082—which is hereby incorporated herein in its entirety by reference, or a pyrheliometer) or by reference to a model (to determine, for example, the location of the Sun, or the current soiling of reflectors). In addition to the various state variables, various configuration variables describing various attributes of the system will be used. These configuration variables are quasi-static in that they are generally unchanging over long periods of time. These configuration variables include, but are not limited to: heliostat locations; heliostat coordinate system transformations; heliostat operational status; heliostat reflectivity; maximum heliostat motion capability; maximum heliostat operational wind speed; receiving locations; receiver operational status; receiver incident radiation acceptance angles; maximum receiver incident radiation flux; desired receiver incident radiation flux. Generally but without limitation, the value of each of these configuration variables is obtained during operational use by standard methods used in the field of computer software (for example, lookup in a database or coded as constants).

The second general step 2820 is to compute various intermediate values to be used as parameters to the objective function. The parameters of the objective function might include but are not limited to: the angle between and the cosine of the angle between the Sun vector and the reflector normal vector for each heliostat considered; the angle between and the cosine of the angle between the reflector normal vector and a receiving location vector for each heliostat considered and for each receiving location considered; the transmissivity of the atmosphere along each possible path between a considered heliostat and a considered receiving location. The computation of these intermediate values can be facilitated by limiting the number of heliostats and receiving locations considered at any one time for evaluation by the objective function.

The third general step 2830 is to compute values of the objective function for various sets of parameters assembled from the previously computed intermediate values. The objective function is selected to compute a value that can be used to determine an optimal decision, in the present invention, the target receiving location to which a heliostat should direct its incident radiation. The objective function might compute for example but without limitation: heliostat efficiency; total radiation loss; receiver temperature; receiver thermodynamic efficiency; overall system efficiency; overall system power generation; overall system revenue generation. The output of the objective function might represent an optimal value (for example but without limitation) when it is at a minimum value, a maximum value, or a value of zero. The objective function might be applied to a single heliostat at a time, to a small group of heliostats, or to large subsets of the heliostat field to effect a large-scale optimization.

The fourth general step 2840 is to determine what set of parameters considered will produce the optimal value of the objective function and therefore which target receiving location is judged optimal (according to the objective function) for each heliostat. The heliostat or heliostats may then be commanded to the optimal target receiving location.

As a final general step 2850, the target receiving locations are distributed as required to effect pointing control of individual heliostats.

Figure 28B:
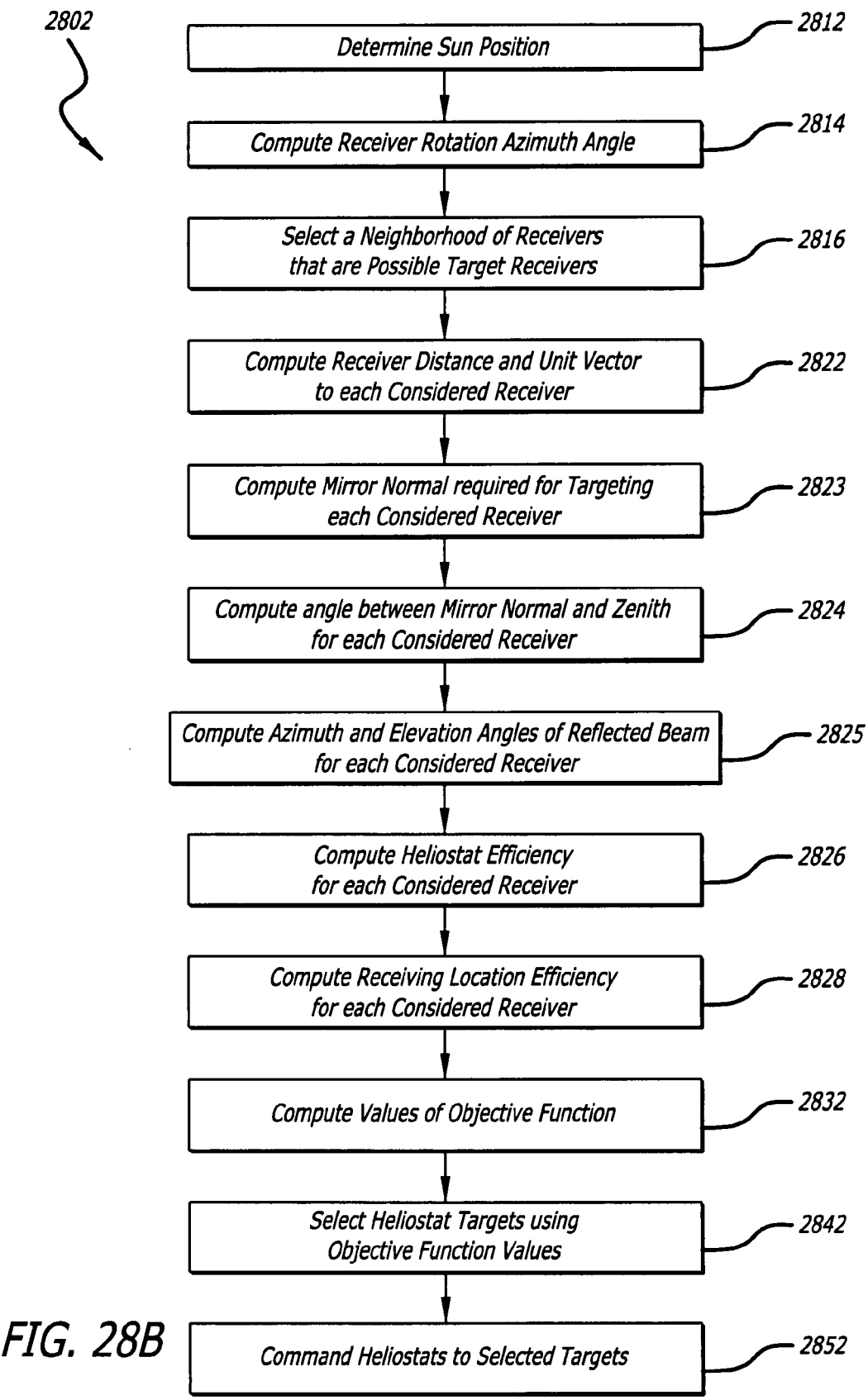

One method of configuring a solar energy collection system in accordance with the present invention is described herein with reference to FIG. 28B. This method 2802 considers one heliostat at a time and a plurality of receivers, and uses efficiency as the objective function.

In the first detail step 2812 the Sun's position is determined. This determination might be implemented by measurement (for example, using a Sun sensor) or by model (for example, using an ephemeris). The Sun's position is represented by a vector, S, having three components, x, y, and z, representing coordinates in each axis of a local coordinate system. In the following description of the method, vectors are represented by capital letters and scalar values are represented by lower case letters.

In the second detail step 2814, the azimuth rotation angle of the receivers is computed. In a system using primarily acute-angle reflection, each receiver aperture will be oriented such that the azimuth angle of the center of its aperture will be 180° from the Sun's azimuth. In a system using primarily oblique-angle reflection, each receiver aperture will be oriented such that the azimuth angle of the center of its aperture will be equal to the Sun's azimuth.

In the third detail step 2816, a set of receiving locations is selected as possible target receiving locations for consideration. This set of receiving locations is a subset of receiving locations of the entire system to reduce the computational burden. This selection process might be implemented without limitation by selecting only receiver positions that are within a pre-determined distance from the heliostat. This determination might be made based on brute-force computation of the distance between the heliostat and each receiving location in system and comparing that distance with the pre-determined distance limit, or the determination might be made based on a suitable choice of heliostat and receiving location nomenclature that allows trivial determination of a subset.

In the fourth detail step 2822, the distance to each receiving location and the direction to each receiving location in the considered subset of receiving locations are computed. The distance r(n) may be computed as the magnitude of the vector R(n), where R(n) represents the vector between the heliostat and the n-th receiving location. R(n) may be computed by subtracting the vector value representing the position of the heliostat from the vector value representing the position of the n-th receiving location. The receiver location direction vector may be computed as the unit-length vector computed by dividing each of the three components of vector R(n) by r(n). Note that the receiver location direction vector is equal to the required reflection direction vector. This step may be represented more succinctly as:

Receiver Vector: $R(n)$=Receiving Location Vector− Heliostat Location Vector

Receiver Distance: $r(n)=|R(n)|$ (where $|R|$ is the magnitude of vector $R$)

Unit Reflection Vector: $F(n)=R(n)/r(n)$ where n is taken for each member of the considered subset of receiving location In the fifth detail step 2823, the reflector normal required to target each considered receiving location is computed. This vector value, N, may be computed by taking the vector sum of the Sun position vector, S, and the receiver location direction vector, F, and dividing each scalar component of the vector sum by the magnitude of the vector sum. The set of values of N for each member of the considered subset of receiving locations is denoted herein N(n). This step may be represented more succinctly as:

Reflector Normal: $N(n)=(S+F(n))/|S+F(n)|$ where n is taken for each member of the considered subset of receiving locations In the sixth detail step 2824, the angle between the required reflector normal and the local zenith, $\theta_{NZ}$, is computed for each member of the considered subset of receiving locations by taking the arccosine (inverse cosine) of the z-component of the reflector normal vector. The set of these values is denoted herein as $\theta_{NZ}(n)$. This step may be represented more succinctly as:

$\theta_{NZ}(n)=a\cos(N_Z(n))$ where n is taken for each member of the considered subset of receiving locations and where $N_Z$ is the z-component of vector N In the seventh detail step 2825, the azimuth angle and the zenith angle of the direction vector representing the reflected radiation are computed. The azimuth angle may be computed by taking the arctangent of $F_X(n)/F_Y(n)$ considering the sign of both $F_Y(n)$ and $F_X(n)$ as is often performed in software systems with the atan2( ) function. The zenith angle may be computed by taking the arccosine of $F_Z(n)$, the z-component of the unit vector F(n). The set of azimuth angles of the reflected radiation for the various members of the considered subset of receiving locations is denoted herein as $\theta_{RA}(n)$. The set of zenith angles of the reflected radiation for the various members of the considered subset of receiving locations is denoted herein as $\theta_{RZ}(n)$. This step may be represented more succinctly as:

$\theta_{RA}(n)=a\tan 2(F_Y(n),F_X(n))$ $\theta_{RZ}(n)=a\cos(F_Z(n))$ where n is taken for each member of the considered subset of receiving locations In the eighth detail step 2826, heliostat efficiency is computed. In this example method, heliostat efficiency is the product of heliostat reflector cosine efficiency and heliostat-to-receiving location atmospheric transmissivity. Heliostat reflector cosine efficiency may be computed by taking the vector dot product between Sun position vector S and the reflector unit normal N for each considered receiving location: $\eta_{HELIOSTAT-COSINE}(n)=N(n)\bullet S$, where • is the vector dot product, and where n is taken for each member of the considered subset of receiving location. Heliostat efficiency might also include but not be limited to terms for reflector cleanliness and reflector shape distortions that are a function of reflector orientation. Atmospheric transmissivity may be computed from a model, such as a function of distance from the heliostat to each considered receiving location. The model might be static or might rely on prevailing atmospheric conditions. In this example method, atmospheric transmissivity is computed as $\tau_{HAZY}=0.98707-0.2748*r+0.03394*r^2$ where r, the distance from the heliostat to a considered receiving location, is in km. The overall heliostat efficiency with respect to a considered receiver location is the product of the underlying efficiencies; in this example, $\eta_{HELIOSTAT}(n)=\tau_{HELIOSTAT-RECEIVER}(n)*\eta_{HELIOSTAT-COSINE}(n)$, where n is taken for each member of the considered subset of receiving locations.

In the ninth detail step 2828, receiving location efficiency considerations are computed. For example, receiving locations that are out of service would be considered to have zero efficiency. More generally, the receiving location can be considered to have an efficiency associated with its availability, ranging from zero (offline) to 1.0 (available with 100% certainty). A simple algorithm might be $\eta_{RECEIVER-AVAILABILITY}(n)=0.0$ if the receiver is out of service, 1.0 otherwise. Other aspects of receiving location efficiency may be considered to be exactly zero (0.0) or unity (1.0). For example, a receiving location that would require the heliostat to be commanded to an impossible or damaging orientation may be considered to have an efficiency of zero: $\eta_{HELIOSTAT-MOTION-ACCEPTABILITY}(n)=1.0$ if $(\theta_{NZ}(n)<\theta_{HELIOSTAT-MOTION-LIMIT})$, 0.0 otherwise, where $\theta_{NZ}(n)$ was computed in the sixth detail step 2824. Note that the particular computation $\theta_{NZ}(n)$ and comparison against a single limit value is only one possible method for determining heliostat movement restrictions. Other methods might include computation of two angles, for example, azimuth and elevation angles that directly correspond to the two axes of control of an alt-az mount. Other receiver efficiency considerations might include but not be limited to received radiation incidence angle or receiver temperature. A simplification of received radiation incidence angle might be to consider only whether it lies within the limits of the aperture of the receiver. In this example, a receiver that is oriented such that the heliostat's reflected radiation would be outside its aperture acceptance angle may be considered to have an efficiency of zero: $\eta_{RECEIVER-ACCEPTANCE}=1.0$ if both $(\theta_{RA}(n)<\theta_{RECEIVER-AZIMUTH-ACCEPTANCE-ANGLE})$ and $(\theta_{RZ}(n)<\theta_{RECEIVER-ELEVATION-ACCEPTANCE-ANGLE})$, 0.0 otherwise. The overall receiver efficiency is the product of the underlying efficiencies; in this example, $\eta_{RECEIVER}(n)=\eta_{RECEIVER-AVAILABILITY}(n)*\eta_{RECEIVER-ACCEPTANCE}*\eta_{HELIOSTAT-MOTION-ACCEPTABILITY}(n)$ where n is taken for each member of the considered subset of receiving locations.

In the tenth detail step 2832, the value of the objective function, J( ), is computed for each of the considered receiving locations. In this example, J( ) is simply the product of the heliostat efficiency and the receiver efficiency: $J(n)=\eta_{HELIOSTAT}(n)*\eta_{RECEIVER}(N)$ where n is taken for each member of the considered subset of receiving locations.

In the eleventh detail step 2842, the target receiving location for the heliostat is the one that maximizes J( ), that is, the receiving location k that has the largest value of J(k) where k is one of the considered subset of receiving locations.

In the twelfth detail step 2852, the heliostat is commanded to drive its reflector to the orientation N(k), where N(k) is the previously computed normal vector for considered receiving location k and k is the receiving location whose value maximized J( ) as determined in the eleventh detail step 2842.

Figure 29:
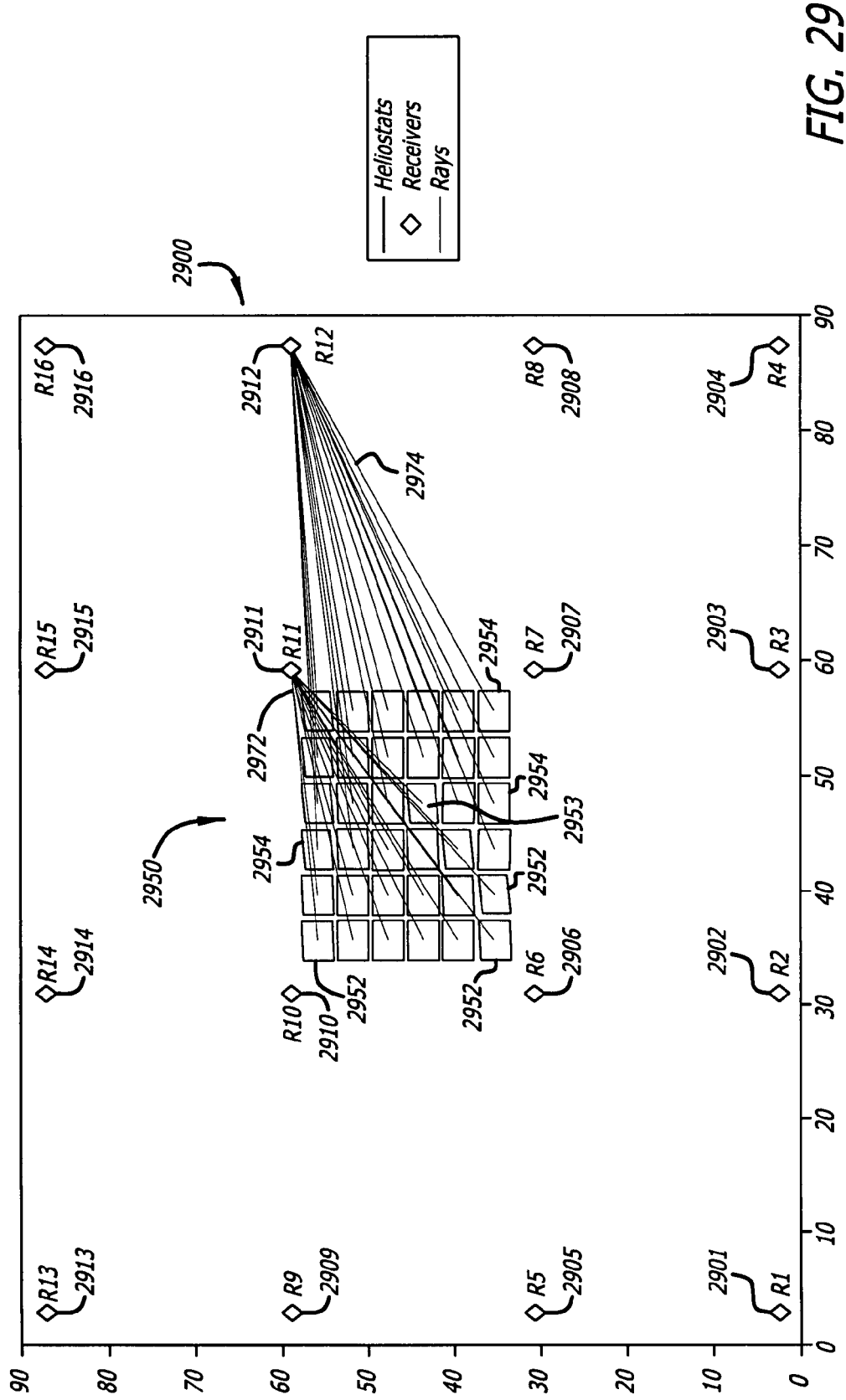
FIG. 29 depicts the associations and orientations of a plurality of heliostats to a plurality of receiving locations for oblique-angle reflection at 15:20 p.m. during an equinox in accordance with the present invention.
Figure 30:
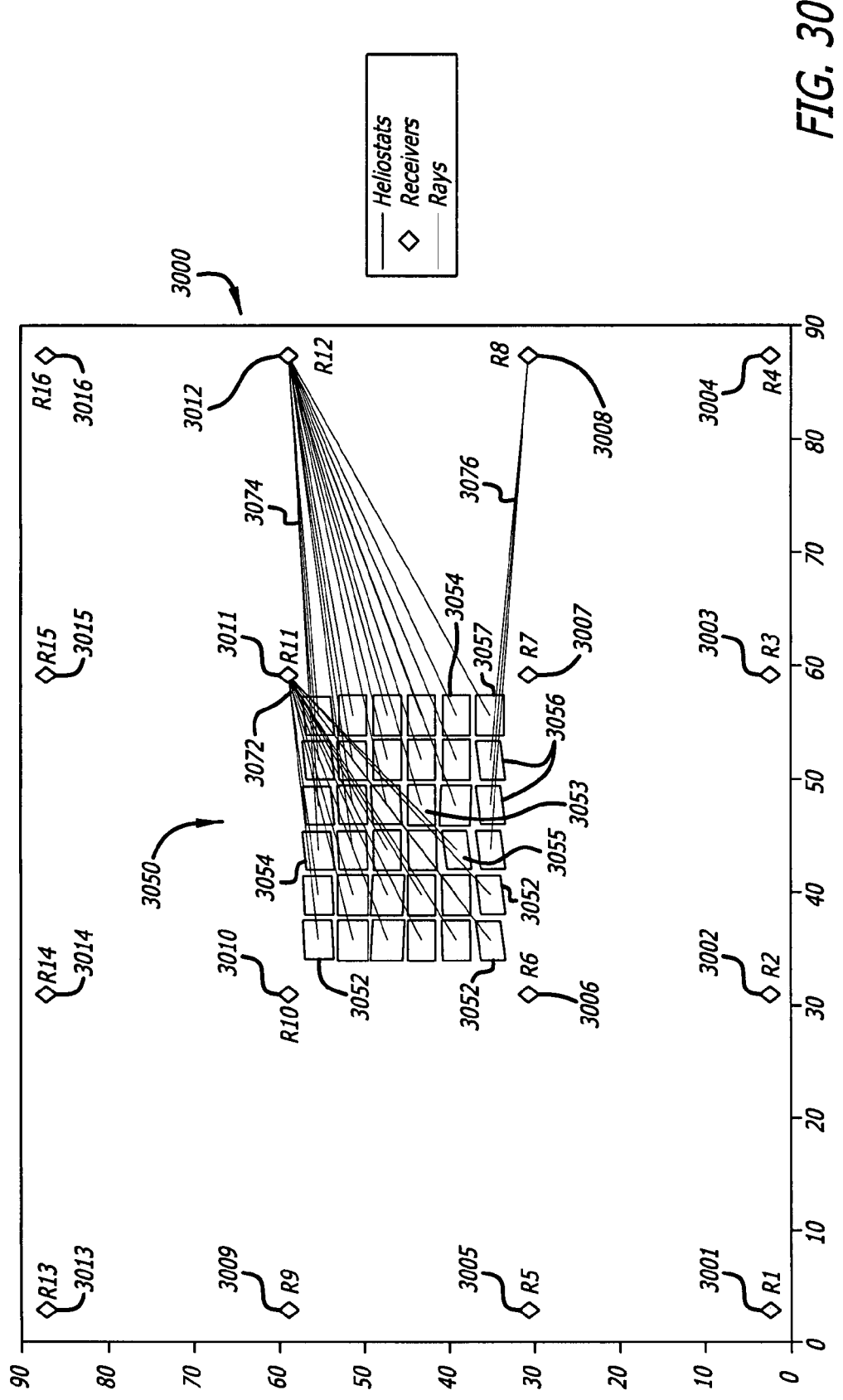
FIG. 30 depicts the associations and orientations of a plurality of heliostats to a plurality of receiving locations for oblique-angle reflection at 15:30 p.m. during an equinox in accordance with the present invention.
Figure 31:
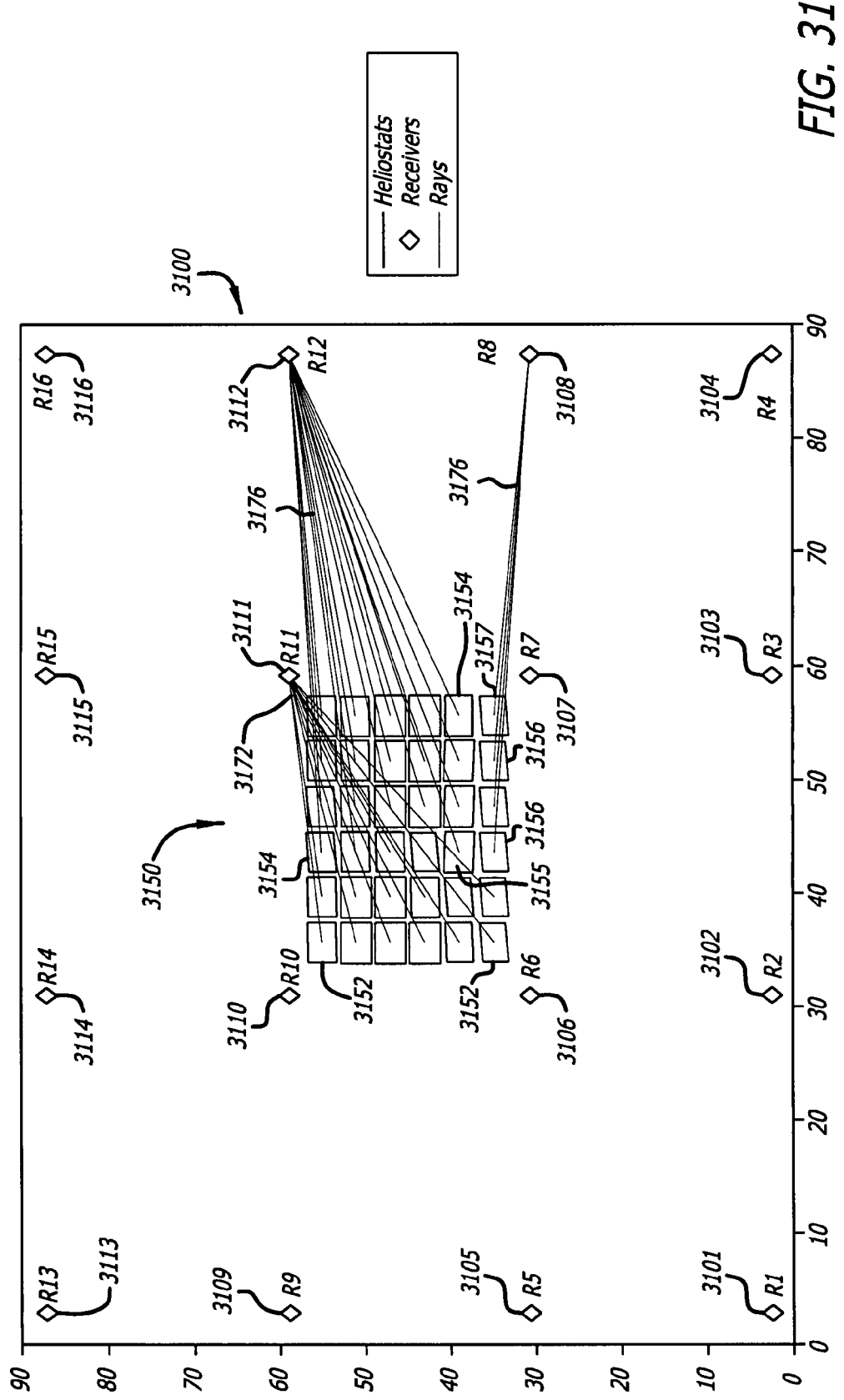
FIG. 31 depicts the associations and orientations of a plurality of heliostats to a plurality of receiving locations for oblique-angle reflection at 15:40 p.m. during an equinox in accordance with the present invention.
Figure 32:
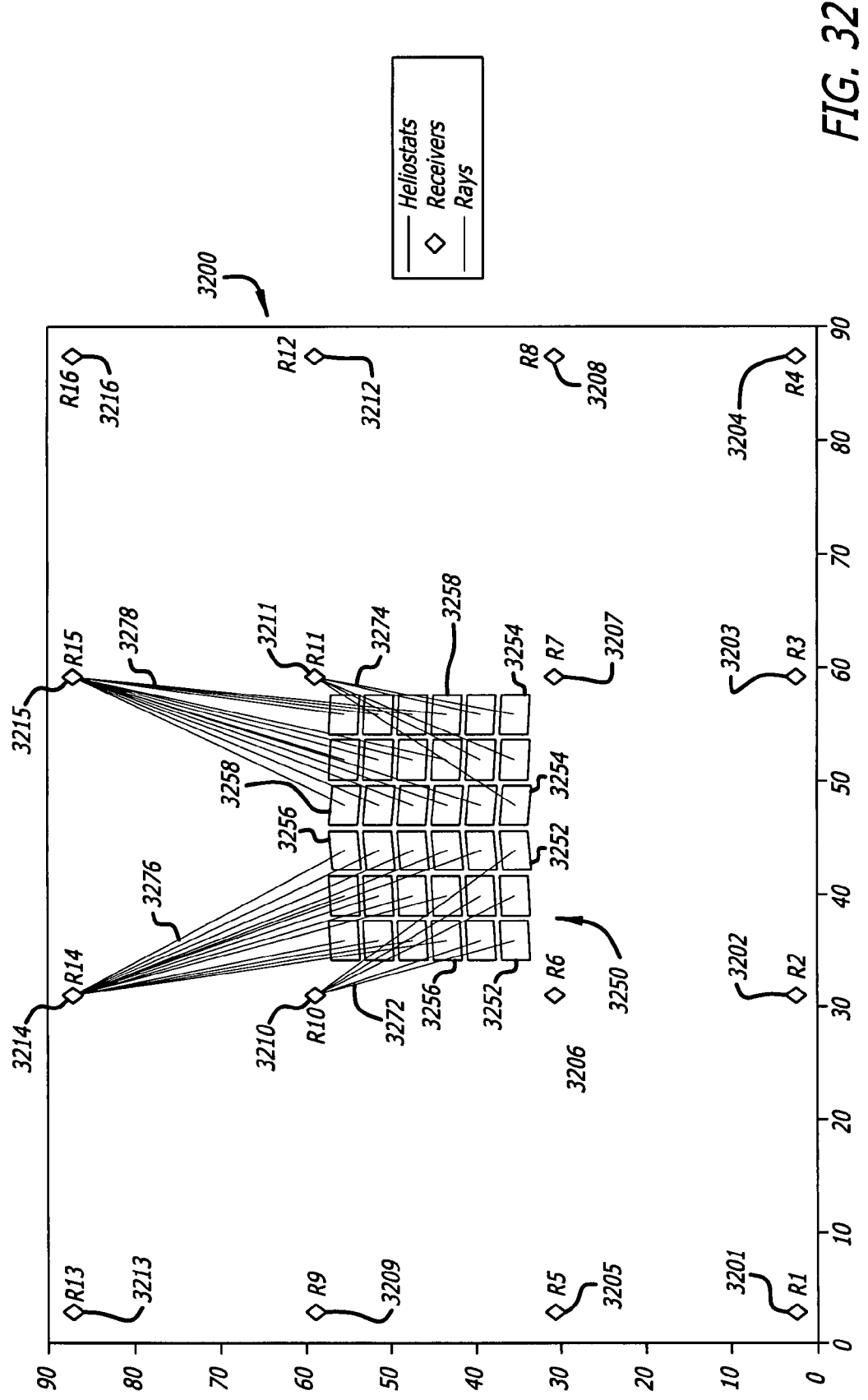
FIG. 32 depicts the oblique-angle reflections from a plurality of heliostats targeted to a plurality of receiving locations at 11:50 a.m. during an equinox in accordance with the present invention.
Figure 33:
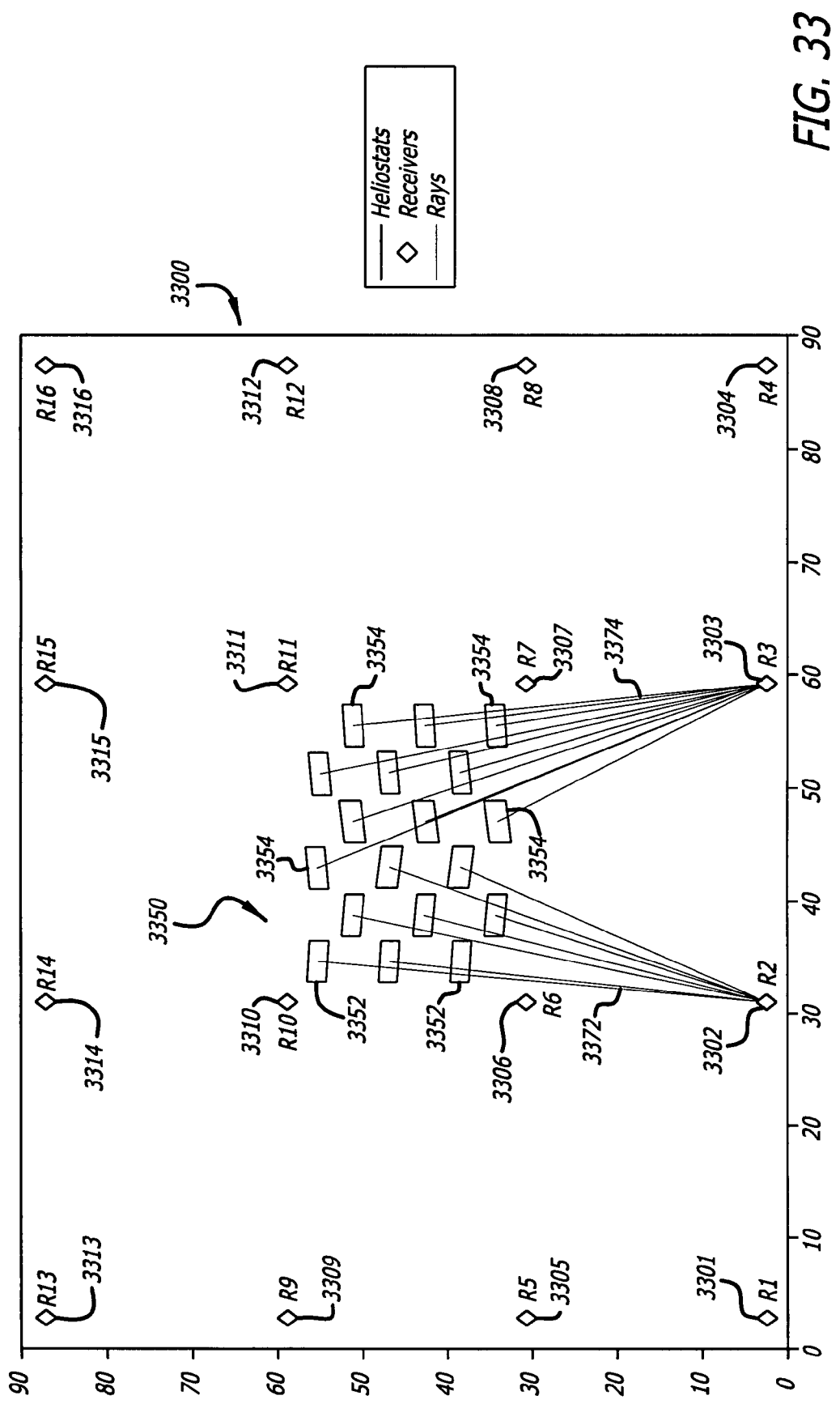
FIG. 33 depicts the acute-angle reflections from a plurality of heliostats targeted to a plurality of receiving locations at 11:50 a.m. during an equinox in accordance with the present invention.

FIG. 29 to FIG. 33 illustrate the described method. FIG. 29 to FIG. 31 illustrate a handoff resulting from the described method. FIG. 32 to FIG. 33 illustrate the difference between a system using oblique-angle reflection and one using acute-angle reflection. All five figures FIG. 29 to FIG. 33 illustrate dynamic changes occurring in the same system comprised of heliostats and receiving locations for Sun angles occurring on an equinox in Barstow. All times discussed are in local standard time.

FIG. 29 illustrates a portion of a large system 2900. Only sixteen receiving locations 2901-2916 (R1-R16) are shown and a heliostat subfield 2950 configured from a six-by-six array of thirty-six heliostats 2954, 2956 is shown. The receiving locations and heliostats shown should be considered to be part of a much larger system. The heliostat subfield 2950 should be considered to be replicated in each of the eight other similar locations between each four receiving locations of FIG. 29. In a typical large system, it is envisioned that hundreds or even thousands of receiving locations might be implemented and a commensurate number of heliostat subfields. Note also that the selection of a rectangular (square) matrix of receiving locations, of a rectangular (square) matrix of heliostats, of the use of densely-packed heliostats and the number of heliostats in the heliostat subfield should be considered representative for the purposes of illustrating the method but should in no way be considered limiting the practice of the described method.

FIG. 29 shows the configuration resulting from the described algorithm as applied to the selected portion of heliostat field 2950 for 15:20 hours, wherein the Sun's elevation is 31.1° and its azimuth is 245.7°. In this illustration, heliostat subfield 2950 is configured for oblique-angle reflection, thus each targeted receiving location 2911 (R11), 2912 (R12) lies opposite its associated heliostat group from the Sun position. According to the algorithm of the method, individual members of an associated heliostat group 2952 are dynamically targeted to a receiving location 2911 (R11) and generate a group of reflected rays of solar radiation 2972. Similarly, individual members of another associated heliostat group 2954 are dynamically targeted to another receiving location 2912 (R12) and generate another group of reflected rays of solar radiation 2974.

FIG. 30 shows the configuration resulting from the described algorithm at 15:30, 10 minutes later than FIG. 29, wherein the Sun's elevation is 29.3° and its azimuth is 247.6°. Note that receiving locations 3001-3016 (R1-R16) are the same as receiving locations 2901-2916 (R1-R16) and the thirty-six heliostats of heliostat subfield 3050 are the same heliostats as those of heliostat subfield 2950. In FIG. 30, three heliostats 3056, 3057 have been dynamically retargeted to receiving location 3008. One of the heliostats of associated heliostat group 3056 was targeted to receiving location 2911 (R11) at 15:20 in FIG. 29. Two of the heliostats of associated heliostat group 3056 were targeted to receiving location 2912 (R12) at 15:20 in FIG. 29. Additionally, one heliostat 3053 has been retargeted from receiving location 2911 (R11) to receiving location 3012 (R12).

FIG. 31 shows the configuration resulting from the described algorithm at 15:40, 10 minutes later than FIG. 30 and 20 minutes later than FIG. 29, wherein the Sun's elevation is 27.4° and its azimuth is 249.4°. Again, receiving locations 3101-3116 (R1-R16) are the same as receiving locations 2901-2916 (R1-R16) and the thirty-six heliostats of heliostat subfield 3150 are the same heliostats as those of heliostat subfield 2950. In FIG. 31, a heliostat 3157 has been dynamically retargeted from one receiving location 3012 (R12) at 15:30 to a different receiving location 3108 (R8) by 15:40, resulting in the heliostat 3157 becoming a member of associated heliostat group 3156. Additionally, a heliostat 3155 has been dynamically retargeted from one receiving location 3011 (R11) to a different receiving location 3112 (R12).

FIG. 32 to FIG. 33 illustrate the differences in heliostat targeting between a system using oblique-angle reflection and one using acute-angle reflection resulting from the described target selection method. FIG. 32 illustrates a dense heliostat packing for an oblique-angle reflection application. FIG. 33 illustrates a sparse heliostat packing for an acute-angle reflection application. In both illustrations, the time is 11:50 (local standard time) on an equinox at Barstow, Calif., wherein the Sun is positioned at elevation 55.4°, azimuth 177.8°.

The heliostats targeted to receiving location 3214 will include associated heliostat group 3256 plus three groups of heliostats analogous in shape to those of associated heliostat groups 3252, 3254, 3258. As can be appreciated, the set of all heliostats targeted to receiving location 3214, when viewed from above, will assume a shape similar to that illustrated by heliostat 1152 of FIG. 11 (although FIG. 33 assumes oblique-angle reflection whereas FIG. 11 assumes acute-angle reflection).

The present invention improves upon the prior art by allowing systems to be constructed wherein cosine loss associated with off-axis heliostat reflector reflections is reduced. Since the Sun will rarely (if ever) be in the same direction as the receiver, each mirror's effectiveness will be compromised by some amount of cosine loss. This has been identified in the prior art as the single biggest loss mechanism in the heliostat field. In large systems wherein the heliostat field surrounds the central receiver, the annual average cosine efficiency of mirrors in the heliostat field is 75% to 80%. For practical systems wherein the heliostat field is constrained to a smaller arc to the north of the receiver the annual average cosine efficiency of mirrors in the heliostat field might approach 90%. Compare this with the efficiency of a clean mirror at 94%. Cosine losses can be minimized through proper field design; however, they still represent the single most important loss mode.

For a small, somewhat optimized system with a heliostat field spanning a ±30° arc (around the meridian) and extending from one tower height to three tower heights away, the annual average mirror cosine efficiency in a prior art system is somewhere around 88%. For the same system, looking only at noon, the average mirror cosine efficiency would be about 95%. Thus, the prior art might be considered to be subject to a 7% efficiency loss (relative) compared with peak power production that is attributable solely to cosine losses incurred by heliostat-controlled pointing of mirrors. Although this number does not show up in peak power rating of a central receiver solar power station, it directly affects the amount of energy produced by the system.

The present invention describes one embodiment wherein heliostats are driven in such a way that the receiver is always between the Sun and the middle of the active heliostat field. In such a system, the average cosine loss of the heliostat field is minimized, limiting it to near the value that would be observed if the Sun were always crossing the meridian (albeit at more widely varying elevation angles). Thus, implementation of this embodiment would be expected to achieve an increase in annual energy production of some 8% to 10% relative to the state of the art. By comparison, high-efficiency multi-junction solar cell technology has been improving at about 2% to 3% (relative) per year for the last 10 years. Thus, this embodiment of the present invention presents efficiency gains comparable to those expected in a 3 to 4 year development period in the only other applicable central receiver technology whose efficiency is being improved.

While prior art has considered the possibility of targeting heliostats to different receiving locations (see, for example, U.S. Pat. No. 4,137,897), the efficiency gain through reduced cosine loss is not described. In particular, although U.S. Pat. No. 4,137,897 discusses the ability to direct heliostats to "any of many central receivers," the patent does not anticipate a significant separation between receivers, stating that " . . . a spare [central receiver] may be installed adjacent to a primary unit . . . "

While particular forms of the present invention have been illustrated and described, it will also be apparent to those skilled in the art that various modifications can be made without departing from the spirit and scope of the invention. Accordingly, it is not intended that the invention be limited, except as by the appended claims.

I claim:

1. A solar energy collection system, comprising:
   a first receiver configured at a first receiving location for receiving solar energy;
   a second receiver configured at a second receiving location for receiving solar energy; and
   a plurality of heliostats each having a reflector assembly, wherein each heliostat is configured to orient the reflector assembly so as to direct incident solar radiation toward the first receiver, and wherein each heliostat is configured to orient the reflector assembly so as to direct incident solar radiation toward the second receiver,
   wherein the second receiving location is geographically separated from the first receiving location,
   wherein at least one heliostat is configured to limit cosine loss,
   wherein each heliostat is controlled to direct reflected solar radiation to either the first receiver or the second receiver as a function of system state,
   wherein each heliostat is controlled based on a function of one or more system state variables consisting of the time of day, the season of the year, the Sun's position, the transmissivity of the atmosphere, the local weather, the local atmospheric temperature, the local wind speed, the temperature of each receiver, the number of heliostats directing solar radiation to each receiver, the current commanded orientation of each heliostat, the measured orientation of each heliostat and heliostat cleanliness,
   wherein each heliostat is controlled to direct reflected solar radiation to either the first receiver or the second receiver as a function of system configuration, and
   wherein each heliostat is controlled based on a function of one or more system configuration variables consisting of heliostat locations, heliostat coordinate system transformations, heliostat operational status, heliostat reflectivity, maximum heliostat motion capability, maximum heliostat operational wind speed, receiving locations; receiver operational status, receiver incident radiation acceptance angles, maximum receiver incident radiation flux and desired receiver incident radiation flux.

2. The solar energy collection system of claim 1, wherein each heliostat is controlled such that an angle between the incident solar radiation and reflected solar radiation directed to the first receiver is an acute angle.

3. The solar energy collection system of claim 1, wherein each heliostat is controlled such that an angle between the incident solar radiation and reflected solar radiation directed to the first receiver is always an acute angle.

4. The solar energy collection system of claim 1, wherein each heliostat is controlled such that an angle between the incident solar radiation and reflected solar radiation directed to the first receiver is an oblique angle.

5. The solar energy collection system of claim 1, wherein each heliostat is controlled such that an angle between the incident solar radiation and reflected solar radiation directed to the first receiver is always an oblique angle.

6. The solar energy collection system of claim 1, wherein at least one heliostat is directed to a first receiver to limit shadowing of incident solar radiation on at least one other heliostat.

7. The solar energy collection system of claim 1, at least one heliostat is directed to a first receiver to limit blocking of reflected solar radiation from at least one other heliostat.

8. The solar energy collection system of claim 1, wherein the first receiver and the second receiver are more distant from the heliostat than a third receiver.

9. The solar energy collection system of claim 1, wherein the system is configured to reduce the manufacturing cost of the first receiver and the second receiver.

10. A solar energy collection system, comprising:
    a plurality of receivers each receiver being positioned at a geographically separate receiving location from each other receiver and being configured for receiving solar energy; and a plurality of heliostats, each heliostat having a reflector assembly and being controlled to orient the reflector assembly so as to direct incident solar radiation toward each one of the receivers, wherein one or more heliostats are configured within a first associated heliostat group to dynamically target incident solar radiation to a first receiver under a first set of operating conditions, wherein one or more heliostats are configured within a second associated heliostat group to dynamically target incident solar radiation to a second receiver under a first set of operating conditions, wherein at least one heliostat in the first associated heliostat group is configured to retarget incident solar radiation to the second receiver under a second set of operating conditions, wherein the first set of operating conditions and the second set of operating conditions are chosen from one or more system state variables consisting of the time of day, the season of the year, the Sun's position, the transmissivity of the atmosphere, the local weather, the local atmospheric temperature, the local wind speed, the temperature of each receiver, the number of heliostats directing solar radiation to each receiver, the current commanded orientation of each heliostat, the measured orientation of each heliostat and heliostat cleanliness, and wherein the first set of operating conditions and the second set of operating conditions are chosen from system configuration variables consisting of heliostat locations, heliostat coordinate system transformations, heliostat operational status, heliostat reflectivity, maximum heliostat motion capability, maximum heliostat operational wind speed, receiving locations; receiver operational status, receiver incident radiation acceptance angles, maximum receiver incident radiation flux and desired receiver incident radiation flux.

11. The solar energy collection system of claim 10, wherein one or more heliostats are configured within a third associated heliostat group to dynamically target incident solar radiation to a third receiver, and wherein at least one heliostat in the first associated heliostat group is configured to retarget incident solar radiation to the third receiver under a second set of operating conditions.

12. The solar energy collection system of claim 10, wherein one or more heliostats are configured within a third associated heliostat group to dynamically target incident solar radiation to a third receiver, and wherein at least one heliostat in the first associated heliostat group is configured to retarget incident solar radiation to the third receiver under a third set of operating conditions.

* * * * *